US012484085B2

United States Patent
Liu et al.

(10) Patent No.: US 12,484,085 B2
(45) Date of Patent: Nov. 25, 2025

(54) ACCESS METHOD AND APPARATUS, AND COMMUNICATIONS SYSTEM

(71) Applicant: HUAWEI TECHNOLOGIES CO., LTD., Guangdong (CN)

(72) Inventors: Hang Liu, Beijing (CN); Jian Wang, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 512 days.

(21) Appl. No.: 17/975,448

(22) Filed: Oct. 27, 2022

(65) Prior Publication Data
US 2023/0050090 A1 Feb. 16, 2023

Related U.S. Application Data

(63) Continuation of application No. PCT/CN2020/087894, filed on Apr. 29, 2020.

(51) Int. Cl.
*H04W 4/00* (2018.01)
*H04W 48/16* (2009.01)
*H04W 74/08* (2009.01)

(52) U.S. Cl.
CPC ........... *H04W 74/08* (2013.01); *H04W 48/16* (2013.01)

(58) Field of Classification Search
CPC ............................ H04W 74/08; H04W 48/16
USPC ......................................................... 370/328
See application file for complete search history.

(56) References Cited

U.S. PATENT DOCUMENTS

| 11,792,854 B2 * | 10/2023 | Lou ........................... H04L 1/16 370/335 |
| 2008/0112351 A1 * | 5/2008 | Surineni ........... H04W 74/0816 370/312 |
| 2012/0099543 A1 | 4/2012 | Yang et al. |
| 2017/0338935 A1 * | 11/2017 | Ahn .................. H04W 72/0446 |
| 2018/0020475 A1 * | 1/2018 | Kim ....................... H04W 72/04 |

(Continued)

FOREIGN PATENT DOCUMENTS

| CN | 102469547 A | 5/2012 |
| CN | 102547914 A | 7/2012 |
| CN | 107466084 A | 12/2017 |

(Continued)

OTHER PUBLICATIONS

Office Action in Japanese Appln. No. 2022-566433, mailed on Nov. 20, 2023, 6 pages (with English translation).

(Continued)

*Primary Examiner* — Temica M Beamer
(74) *Attorney, Agent, or Firm* — Fish & Richardson P.C.

(57) ABSTRACT

An access method and apparatus, and a communications system is provided One example method includes: The network control apparatus sends access configuration information, where the access configuration information configures an access manner of the at least one second apparatus, and the access manner includes a first access manner or a second access manner. A second apparatus in the at least one second apparatus sends access information of the second apparatus to the network control apparatus based on the access configuration information, where the access information requests access. The network control apparatus receives the access information from the second apparatus.

32 Claims, 4 Drawing Sheets

(56) References Cited

U.S. PATENT DOCUMENTS

2020/0252968 A1\* 8/2020 Lv .................. H04L 5/0051

FOREIGN PATENT DOCUMENTS

| | | |
|---|---|---|
| CN | 107734707 A | 2/2018 |
| CN | 107770733 A | 3/2018 |
| CN | 107872780 A | 4/2018 |
| CN | 110099459 A | 8/2019 |
| CN | 108282895 B | 12/2019 |
| EP | 3443704 B1 | 7/2019 |
| JP | 2004364069 A | 12/2004 |
| WO | 2017211221 A1 | 12/2017 |
| WO | 2018036182 A1 | 3/2018 |
| WO | 2018125686 A2 | 7/2018 |
| WO | 2020037569 A1 | 2/2020 |

OTHER PUBLICATIONS

Extended European Search Report in European Appln No. 20933847.4, dated Apr. 4, 2023, 9 pages.
International Search Report and Written Opinion in International Appln. No. PCT/CN2020/087894, mailed on Jan. 14, 2021, 15 pages (with English translation).

\* cited by examiner

ACCESS METHOD AND APPARATUS, AND COMMUNICATIONS SYSTEM

CROSS-REFERENCE TO RELATED APPLICATIONS

This application is a continuation of International Application No. PCT/CN2020/087894, filed on Apr. 29, 2020, the disclosure of which is hereby incorporated by reference in its entirety.

TECHNICAL FIELD

This application relates to the communications field, and more specifically, to an access method and apparatus, and a communications system in the communications field.

BACKGROUND

With people's increasing requirements for personalized driving experience, an intelligent cockpit service plays an increasingly important role in people's driving process. An intelligent cockpit usually includes a plurality of devices such as a cockpit domain controller (cockpit domain controller, CDC), a vehicular acoustic device, a vehicular microphone, a vehicular display, an intelligent terminal, and another portable device. The CDC is connected to various devices in a wired manner or a wireless manner, and communicates with these devices, so as to provide people with richer entertainment, audio, video, and office experience.

With continuous development of communications technologies, the cockpit domain controller (cockpit domain controller, CDC) may be connected to a vehicular terminal (such as a vehicular speaker and a vehicular screen) and a non-vehicular terminal (such as an intelligent terminal and a Bluetooth headset of a user) in a wireless manner, so as to implement communication between the CDC and a terminal (including the vehicular terminal and/or the non-vehicular terminal).

In an existing wireless communications system, a terminal accesses a network device in a conventional random access manner, for example, a contention-based random access manner. Access requirements comply with Poisson distribution due to random arrival of terminals, that is, access requests of terminals are approximately average in terms of time. When the terminals request random access, there is another terminal that is being served in the system. Therefore, most available time-frequency resources in the system are used to maintain and guarantee a service of the another terminal, and only a limited fixed time-frequency resource is allocated for random access.

There are usually the following two terminal access scenarios in a cockpit domain.

Scenario 1: When a vehicle is just powered on, a plurality of vehicular terminals in a cockpit all initiate access requests to the CDC in a short time. This is a scenario in which the terminals perform batch access or group access.

Scenario 2: After a vehicle runs stably, a non-vehicular terminal needs to access a network, or a link of a vehicular terminal is faulty and the vehicular terminal needs to access the network again. This is a terminal random access scenario.

However, in the conventional random access method, the limited time-frequency resource can carry only very limited terminal access at a time. This cannot ensure reliable communication of the terminal because the terminal cannot flexibly access the network based on a requirement of the terminal in the foregoing different access scenarios.

SUMMARY

Embodiments of this application provide an access method and apparatus, and a communications system, to flexibly access a network based on a requirement of a terminal in different access scenarios, thereby improving communication efficiency and resource utilization.

According to a first aspect, an embodiment of this application provides an access method. The method is applied to a communications system, the communications system includes a network control apparatus and at least one terminal, and the method includes: The network control apparatus sends access configuration information, where the access configuration information is used to configure an access manner of the at least one terminal, and the access manner includes a first access manner or a second access manner. A first terminal in the at least one terminal sends access information of the first terminal to the network control apparatus based on the access configuration information, where the access information is used to request access. The network control apparatus receives the access information from the first terminal. Specifically, the foregoing "access" is initial access.

Optionally, the network control apparatus and the at least one terminal each may be in a plurality of forms. This is not limited in this embodiment of this application.

In a possible implementation, the network control apparatus may be a CDC in a cabin, the at least one terminal may be at least one vehicular terminal in the cabin, and a vehicle manufacturer integrates the CDC and the at least one vehicular terminal into a vehicle to which the cabin belongs.

In another possible implementation, the network control apparatus may be a CDC in a cabin, and the at least one terminal may include at least one terminal of a vehicular terminal or a non-vehicular terminal in the cabin.

It should be noted that before the network control apparatus sends the access configuration information, the at least one terminal is in a non-connected state, that is, none of the at least one terminal accesses a network or establishes a connection to the network control apparatus, or an established connection to the network control apparatus needs to be re-established after being disconnected.

It should be further noted that the non-connected state in this embodiment of this application may include an idle state or an inactive state.

It should be noted that the at least one terminal may belong to at least one terminal type.

Optionally, the terminal type may include a first terminal type or a second terminal type. This is not limited in this embodiment of this application.

In a possible implementation, the first terminal type may be a vehicular terminal type, and the second terminal type may be a non-vehicular terminal type.

For example, the vehicular terminal may include a vehicular speaker, a vehicular display, or a vehicular microphone.

For another example, the non-vehicular terminal may include an intelligent terminal, a Bluetooth headset, or a tablet computer.

Optionally, the first access manner may include a contention-based access manner or a random access manner, and the first access manner is used to indicate that access of terminals of the first terminal type and the second terminal type is allowed.

Optionally, the second access manner may include contention-free access, a group access manner, or a batch access manner, and the second access manner is used to indicate that access of a terminal of only the first terminal type is allowed.

Optionally, the access configuration information may be used to configure the access manner in a plurality of manners. This is not limited in this embodiment of this application.

In a first possible implementation, the access configuration information may include at least one first bit, and the at least one first bit is used to configure the access manner.

In other words, the access configuration information may directly indicate the access manner.

In a second possible implementation, the access configuration information may include first state information, where the first state information is used to indicate a state of the network control apparatus, and the state of the network control apparatus may indicate the access manner of the at least one terminal.

In other words, the access configuration information may directly indicate the state of the network control apparatus, and indirectly indicate the access manner of the at least one terminal by using the state of the network control apparatus.

Optionally, the state of the network control apparatus and the access manner of the terminal may be in a one-to-one correspondence, or may be in a many-to-one relationship. This is not limited in this embodiment of this application.

In a first possible implementation, the network control apparatus may have a first state or a second state, the first state corresponds to the first access manner, and the second state corresponds to the second access manner.

In a second possible implementation, the state of the network control apparatus may include a first state, a second state, a third state, or a fourth state, where the first state and the third state correspond to the first access manner, and the second state and the fourth state correspond to the second access manner.

Optionally, the network control apparatus may send the access configuration information in a plurality of manners. This is not limited in this embodiment of this application.

In a first possible implementation, the network control apparatus may send the access configuration information to each of the at least one terminal.

In a second possible implementation, the network control apparatus may send a multicast message, where the multicast message includes the access configuration information and a multicast address.

It should be noted that the multicast address is an address of a group of terminals, and a message sent to this address may be identified and received by the group of terminals.

For example, the plurality of terminals include a terminal 1 and a terminal 2, the terminal 1 and the terminal 2 belong to a first terminal group, and the multicast message sent by the network control apparatus includes the resource configuration information and a multicast address of the first terminal group. Correspondingly, the terminal 1 and the terminal 2 determine that the terminal 1 and the terminal 2 belong to the first terminal group corresponding to the multicast address, and receive the multicast message.

Optionally, the multicast message may further include terminal quantity information, and the terminal quantity information is used to indicate a quantity of terminals corresponding to the multicast address.

In a third possible implementation, the network control apparatus may send a system broadcast message, where the system broadcast message includes the access configuration information.

According to the access method provided in this embodiment of this application, the network control apparatus includes the access configuration information in the multicast message or the broadcast message. This can reduce a transmission delay, and improve access efficiency.

The following separately describes, by using two different scenarios, an implementation process in which the first terminal in the at least one terminal sends the access information of the first terminal to the network control apparatus based on the access configuration information.

Scenario 1: The access manner is the first access manner (for example, random access or contention-based access), the first access manner indicates that access of the terminal of the first terminal type and the terminal of the second terminal type is allowed, and the first terminal belongs to the first terminal type or the second terminal type.

Optionally, in Scenario 1, that the first terminal in the at least one terminal sends the access information of the first terminal to the network control apparatus based on the access configuration information may include: The first terminal sends the access information of the first terminal to the network control apparatus on the pre-configured first time-frequency resource in the first access manner. Correspondingly, the network control apparatus receives the access information of the first terminal on the first time-frequency resource.

Before the first terminal in the at least one terminal sends the access information of the first terminal to the network control apparatus based on the access configuration information, the first terminal and the network control apparatus need to first determine the first time-frequency resource.

Optionally, the first terminal or the network control apparatus may determine the first time-frequency resource in a plurality of manners. This is not limited in this embodiment of this application.

In a first possible implementation, the network control apparatus may send first resource configuration information to the first terminal in advance, where the first resource configuration information is used to configure the first time-frequency resource. Correspondingly, the first terminal may receive the first resource configuration information from the network control apparatus, and determine the first time-frequency resource based on the first resource configuration information.

In a second possible implementation, the first terminal and the network control apparatus may agree on locations of the first time-frequency resource in time domain and in frequency domain in advance.

In a third possible implementation, the first terminal and the network control apparatus may agree in advance on a rule for determining a location of the first time-frequency resource. The first terminal and the network control apparatus may determine the first time-frequency resource according to the rule.

It should be noted that the first time-frequency resource is a pre-configured, limited, and fixed time-frequency resource. Specifically, the first time-frequency resource may occupy a time domain resource unit (or a time domain length) with a fixed location and a fixed size, and a frequency domain resource unit (or a frequency domain bandwidth) with a fixed location and a fixed size.

It should be further noted that the time domain resource unit may be understood as a scheduling granularity in time domain, for example, a minimum granularity, and the frequency domain resource unit may be understood as a scheduling granularity in frequency domain.

Specifically, the time domain resource unit may be but is not limited to a slot (slot) or a frame, and the frame or the slot includes several symbols (symbol). For example, the symbol is an orthogonal frequency division multiplexing (orthogonal frequency division multiplexing, OFDM) symbol. The frequency domain resource unit may be but is not limited to one or more subcarriers.

For example, it is agreed in a communications protocol that the first time-frequency resource occupies two fixed symbols (symbol) in each slot (slot) in time domain, and occupies two fixed subcarriers (subcarrier) in system bandwidth in frequency domain.

For another example, it is agreed in a communications protocol that the first time-frequency resource occupies one or more fixed resource blocks in an available time-frequency resource of a system.

Optionally, the access information of the first terminal may be represented in a plurality of manners. This is not limited in this embodiment of this application.

In a possible implementation, the access information of the first terminal may include a first identifier, and the first identifier belongs to a pre-configured identifier set.

In other words, the network control apparatus and the first terminal may pre-configure the identifier set. When receiving an identifier belonging to the identifier set, the network control apparatus may determine that the identifier corresponds to a terminal that requests access.

In another possible implementation, the access information of the first terminal may include a first address, and the first address belongs to a pre-configured address set.

In other words, the network control apparatus and the first terminal may pre-configure the address set. When receiving an address belonging to the address set, the network control apparatus may determine that the address corresponds to a terminal that requests access.

Optionally, the first terminal may pre-configure the identifier set (or the address set) in a plurality of manners. This is not limited in this embodiment of this application.

In a first possible implementation, the identifier set (or the address set) may be predefined in a communications protocol, and the first terminal and the network control apparatus may determine the identifier set (or the address set) based on the communications protocol.

In a second possible implementation, the network control apparatus may send first configuration information to the first terminal in advance, where the first configuration information is used to configure the identifier set (or the address set). Correspondingly, the first terminal receives the first configuration information from the network control apparatus, and configures the identifier set (or the address set) based on the first configuration information.

In a third possible implementation, the first terminal and the network control apparatus may agree on the identifier set (or the address set) in advance.

It should be noted that, in an existing random access method, a terminal needs to send a PRACH sequence to a network on a fixed and limited time-frequency resource to request access. Because a PRACH belongs to a signal, parsing complexity of a network device is relatively high.

According to the access method provided in this embodiment of this application, the first terminal sends the network control apparatus the access information in place of a PRACH to request access, where the access information belongs to data. This can reduce parsing complexity of the network control apparatus, and improve communication efficiency.

Because the access information of the first terminal is used to request access, the network control apparatus can only know, based on the access information, that a terminal requests access, but the network control apparatus does not know a real identity of the terminal. Therefore, the network control apparatus needs to determine the real identity of the terminal that requests access.

Optionally, the method may further include: The network control apparatus sends an identity information request to the first terminal based on the access information of the first terminal, where the identity information request is used to request first identity information, and the first identity information is used to identify the first terminal.

Correspondingly, the first terminal receives the identity information request from the network control apparatus, and sends the first identity information to the network control apparatus based on the identity information request.

Correspondingly, the network control apparatus receives the first identity information from the first terminal.

Optionally, the identity information request may be used to indicate that the network control apparatus requests the first identity information, and the identity information request includes identity information of the network control apparatus.

It should be noted that the identity information of the network control apparatus may be understood as information that can uniquely identify the network control apparatus in a communications domain in which the network control apparatus is located. The first identity information of the first terminal may be understood as information that can uniquely identify the terminal in a communications domain in which the first terminal is located.

Optionally, the identity information (for example, the identity information of the network control apparatus or the first identity information of the terminal) in this embodiment of this application may include at least one of the following: a device identifier, a media access control (media access control, MAC) address, a soft address, or a short address.

It should be noted that the device identifier is a string of digits or a serial number that can uniquely identify the terminal, for example, an international mobile equipment identity (international mobile equipment identification number, IMEI) or a mobile equipment identifier (mobile equipment identifier, MEID).

It should be further noted that the MAC address is an address used at a media access layer, and is also referred to as a physical address, or a hardware address.

It should be further noted that the soft address may be an address that is allocated by the network control apparatus to the first terminal during previous access of the terminal and that can uniquely identify the terminal in the communications domain.

It should be further noted that the short address may be an address obtained based on a part of at least one of the device identifier, the MAC address, or the soft address.

For example, the network control apparatus may generate the short address by using 10 least significant bits of any one of the foregoing addresses of the first terminal, and the generated short address can uniquely identify the first terminal in the communications domain.

In a possible implementation, for example, the identity information is a device identification code. The network control apparatus and the first terminal may agree in advance on an encoding rule of the device identification code, that is, agree in advance that different fields in the device identification code have different meanings, and obtain the identity information of the network control apparatus by parsing some or all fields.

Optionally, the identity information may include at least one field. The network control apparatus and the first terminal may define meanings of different fields in a plurality of manners. This is not limited in this embodiment of this application.

In a possible implementation, the identity information may include a first field, and the first field is used to indicate a device type.

In another possible implementation, the identity information may include a second field, and the second field is used to indicate a device function.

In still another possible implementation, the identity information may include a third field, and the third field is used to indicate a device number.

Optionally, the identity information request may further carry second resource configuration information, where the second resource configuration information is used to configure a time-frequency resource used for the first identity information. Correspondingly, the first terminal may send the first identity information to the network control apparatus on the time-frequency resource indicated by the second resource configuration information.

It should be noted that, after receiving the first identity information, the network control apparatus may establish a correspondence between the first identity information and the first address, that is, determine the real identity of the first terminal.

In other words, if the network control apparatus successfully obtains the first identity information through parsing, the first terminal successfully performs access.

Optionally, when determining that the first terminal successfully performs access, the network control apparatus may send scheduling information to the first terminal, where the scheduling information is used to indicate a time-frequency resource to be used by the first terminal to transmit data. Correspondingly, the first terminal receives the scheduling information from the network control apparatus, and transmits data with the network control apparatus on the time-frequency resource indicated by the scheduling information.

Optionally, before the network control apparatus sends the scheduling information to the first terminal, the network control apparatus may send first indication information to the first terminal, where the first indication information is used to indicate that the first terminal successfully performs access.

It should be noted that the scheduling information may also be used to indicate that the first terminal successfully performs access. That is, the network control apparatus does not need to separately send the first indication information to indicate that the first terminal successfully performs access, and the first terminal can determine that the first terminal successfully performs access, provided that the first terminal receives the scheduling information.

It should be further noted that, if the network control apparatus fails to obtain the first identity information through parsing, for example, fails to obtain the first identity information because the network control apparatus fails to obtain the access information of the first terminal through parsing, the first terminal fails to perform access.

Optionally, when determining that the first terminal fails to perform access, the network control apparatus may send second indication information to the first terminal, where the second indication information is used to indicate that the first terminal fails to perform access. Correspondingly, the first terminal may receive the second indication information from the network control apparatus, and initiate random access again on the first time-frequency resource based on the second indication information.

It should be noted that a process in which the first terminal performs access again is similar to the foregoing implementation process of the first access. To avoid repetition, details are not described herein again.

Optionally, after determining that the first terminal successfully performs access, to avoid an address (or identifier) conflict caused because the first terminal and another terminal that requests access select a same address in the address set (or a same identifier in the identifier set), the network control apparatus may re-allocate a new address that does not belong to the address set (or a new identifier that does not belong the identifier set) to the first terminal, and perform subsequent data transmission based on the new address (or the new identifier).

In a first possible implementation, the network control apparatus may send address information to the first terminal, where the address information is used to indicate to update the first address to a second address, the address information carries the second address, and the second address does not belong to the address set.

Correspondingly, the first terminal may receive the address information from the network control apparatus, and update the first address to the second address based on the address information.

In a second possible implementation, the network control apparatus may send identifier information to the first terminal, where the identifier information is used to indicate to update the first identifier to a second identifier, the identifier information carries the second identifier, and the second identifier does not belong to the identifier set.

Correspondingly, the first terminal may receive the identifier information from the network control apparatus, and update the first identifier to the second identifier based on the identifier information.

The following continues to describe an implementation process in which the first terminal in the at least one terminal sends the access information of the first terminal to the network control apparatus based on the access configuration information in Scenario 2. It should be noted that the implementation process in the foregoing Scenario 1 and the implementation process in the following Scenario 2 are independent of each other.

Scenario 2: The access manner is the second access manner (for example, group access, batch access, or contention-free access), the second access manner indicates that access of the terminal of only the first terminal type is allowed, and the first terminal is the terminal of the first terminal type.

Optionally, the access configuration information is further used to configure a first time-frequency resource to be used by the at least one terminal to perform access in the second access manner.

Optionally, in Scenario 2, that the first terminal in the at least one terminal sends the access information of the first terminal to the network control apparatus based on the access configuration information may include: The first terminal sends the access information of the first terminal to the network control apparatus on the first time-frequency resource in the second access manner. Correspondingly, the network control apparatus receives the access information from the first terminal on the first time-frequency resource.

Optionally, before the first terminal in the at least one terminal sends the access information of the first terminal to the network control apparatus based on the access configuration information, the network control apparatus need to first determine the first time-frequency resource.

In a possible implementation, the first time-frequency resource is an available time-frequency resource in the communications domain in which the network control apparatus is located. Compared with a limited and fixed time-frequency resource pre-configured in an existing random access manner, the available time-frequency resource can provide more sufficient resources to meet group access of a plurality of terminals.

For example, the first time-frequency resource may include all available time-frequency resources in the communications domain in which the network control apparatus is located.

It should be noted that all the available time-frequency resources in this embodiment of this application may be referred to as all time-frequency resources that may be used for initial access. Further, all the time-frequency resources occupy at least one time domain resource unit (or a first time domain length) and at least one frequency domain resource unit (or a first frequency domain bandwidth). Because when the vehicle is just powered on, there is no vehicular device access. All the foregoing available time-frequency resources may be used as access resources.

In a possible implementation, after the plurality of terminals complete initial access on all the time-frequency resources used for initial access, the network control apparatus may send a system broadcast message used to indicate that initial access is completed. Correspondingly, a terminal having an access requirement subsequently performs random access in the existing random access method or the random access method provided in Scenario 1 of this application.

It should be further noted that all the available time-frequency resources or all the time-frequency resources used for initial access do not include a time-frequency resource of a symbol (for example, a symbol carrying a pilot signal, a synchronization signal, a control signal, or a broadcast signal) that is available in the communications domain and that is used to carry system control plane overheads.

In other words, all the available time-frequency resources or all the time-frequency resources used for initial access do not include a time-frequency resource used for control information or a control signal. The control information herein may include control signaling used for scheduling data, such as broadcast channel information and data feedback information. The control signal herein may include at least one of a synchronization signal, an access channel signal, a sounding reference signal (sounding reference signal, SRS), a demodulation reference signal (demodulation reference signal, DMRS), or the like.

In the access method provided in this embodiment of this application, in the scenario of group access or batch access, because the vehicle is just powered on, there is no terminal access in the communications domain in which the network control apparatus is located, and the network control apparatus can calculate or determine all the available time-frequency resources in the current communications domain, and allocate all the time-frequency resources to these terminals for group access or batch access. This can meet a requirement of group access or batch access and reduce a probability of a resource conflict occurred during access of the terminals.

Optionally, the network control apparatus may determine the first time-frequency resource in a plurality of manners. This is not limited in this embodiment of this application.

In a possible implementation, for example, the network control apparatus and the at least one terminal belong to a first communications domain. The network control apparatus may receive a broadcast message sent by a second network control apparatus in a second communications domain, where the broadcast message is used to indicate all time-frequency resources occupied by the second communications domain. The network control apparatus may determine the first time-frequency resource based on all the time-frequency resources occupied by the second communications domain.

Optionally, the first communications domain and the second communications domain may belong to a same cabin or different cabins. This is not limited in this embodiment of this application.

It should be noted that a manner in which the network control apparatus determines the first time-frequency resource is described above by using only an example in which the network control apparatus determines the first time-frequency resource based on all the time-frequency resources occupied by the second communications domain. However, this embodiment of this application is not limited thereto.

Optionally, the network control apparatus may determine the first time-frequency resource based on all time-frequency resources occupied by a plurality of communications domains. The plurality of communications domains include the second communications domain. This is not limited in this embodiment of this application.

In another possible implementation, the network control apparatus may obtain the first time-frequency resource by using a higher-layer network device, and the higher-layer network device can calculate and allocate, to each network control apparatus, all available time-frequency resources in a communications domain in which the network control apparatus is located. Optionally, the network control apparatus receives indication information from another network device, where the indication information is used to indicate the first time-frequency resource.

According to the access method provided in this embodiment of this application, in the scenario of group access or batch access, because the vehicle is just powered on, there is no terminal access in the communications domain in which the network control apparatus is located, that is, there is no another terminal or service that needs to be served in the system. Therefore, the network control apparatus can calculate all the available time-frequency resources in the current communications domain, and use all the time-frequency resources for group access or batch access of terminals. This can reduce a probability of a resource conflict occurred during access of the terminals, and improve communication efficiency and resource utilization.

Optionally, the access information may be carried in an access message, where the access message is obtained by performing modulation and coding on the access information by using predefined modulation and coding information, and the modulation and coding information includes at least one of a modulation and coding scheme, a channel coding scheme, and a bit rate.

Correspondingly, the network control apparatus may decode the access message based on the pre-configured modulation and coding information, to obtain the access information.

Optionally, the network control apparatus and the first terminal may obtain the modulation and coding information in a plurality of manners. This is not limited in this embodiment of this application.

In a first possible implementation, the modulation and coding information may be pre-configured in a communications protocol, and the first terminal and the network control apparatus may determine the modulation and coding information based on the communications protocol.

In a second possible implementation, the network control apparatus may send first configuration information to the first terminal in advance, where the first configuration information is used to configure the modulation and coding information. Correspondingly, the first terminal receives the first configuration information from the network control apparatus, and configures the modulation and coding information based on the first configuration information.

Optionally, the access configuration information and the first configuration information may be carried in a same message, or may be carried in different messages. This is not limited in this embodiment of this application.

In a third possible implementation, the first terminal and the network control apparatus may agree on the modulation and coding information in advance.

Optionally, the access information of the first terminal may include at least one of the first identity information or the state information. This is not limited in this embodiment of this application.

It should be noted that the first identity information may be understood as information that can uniquely identify the identity of the first terminal in the communications domain in which the first terminal is located.

Optionally, the identity information (for example, the identity information of the network control apparatus or the first identity information of the terminal) in this embodiment of this application may include at least one of the following: a device identifier, a MAC address, a soft address, or a short address.

Optionally, the identity information (for example, the identity information of the network control apparatus or the first identity information of the terminal) in this embodiment of this application may include at least one field. The network control apparatus and the first terminal may define meanings of different fields in a plurality of manners. This is not limited in this embodiment of this application.

In a possible implementation, the identity information may include a first field, and the first field is used to indicate a device type.

In another possible implementation, the identity information may include a second field, and the second field is used to indicate a device function.

In still another possible implementation, the identity information may include a third field, and the third field is used to indicate a device number.

It should be noted that the state information may be understood as information that can indicate a current state of the first terminal.

Optionally, the first terminal may include a first state or a second state.

For example, the first state may be a "normal state", and the second state may be an "abnormal state".

Optionally, when the state information indicates that the state of the first terminal is the "abnormal state", the state information may further include exception indication information, and the exception indication information is used to indicate an exception cause of the first terminal.

Optionally, the state information may indicate the state of the first terminal in a plurality of manners. This is not limited in this embodiment of this application.

In a possible implementation, the state information may include at least one bit, and the state information may indicate the current state of the first terminal by using the at least one bit.

For example, the state information includes one bit. When the bit is "1", the "normal state" is indicated. When the bit is "0", the "abnormal state" is indicated.

In another possible implementation, the state information may include the exception indication information, and the exception indication information is used to indicate that the state of the first terminal is the "abnormal state" and indicate the exception cause.

It should be noted that, because a terminal may be in the abnormal state after being powered on, for example, a device fault, a line fault, or a network fault, the network control apparatus may agree with the at least one terminal in advance that only a terminal (for example, the first terminal) in the normal state reports access information to the network control apparatus, and the terminal in the abnormal state does not need to report access information.

Optionally, the first terminal may send the access information of the first terminal to the network control apparatus on the first time-frequency resource in a plurality of manners. This is not limited in this embodiment of this application.

In a first possible implementation, the first terminal may send the access information of the first terminal to the network control apparatus on the first time-frequency resource in the contention-based resource manner.

Because the first time-frequency resource indicates all the available time-frequency resources in the communications domain in which the network control apparatus is located, a resource size of the first time-frequency resource is more sufficient than a resource size of the pre-configured limited time-frequency resource used for random access in the existing contention-based random access method. This can reduce a probability of a resource conflict occurred during access of a plurality of terminals.

In a second possible implementation, the first terminal may determine, from the first time-frequency resource, a second time-frequency resource corresponding to the first terminal. The first terminal sends the access information of the first terminal to the network control apparatus on the second time-frequency resource.

It should be noted that the second time-frequency resource corresponding to the first terminal in this embodiment of this application may be understood as a time-frequency resource used by the first terminal to report the access information.

Optionally, when a quantity of the at least one terminal is greater than 1, the first time-frequency resource includes time-frequency resources used for each of the plurality of terminals to report access information.

It should be noted that the time-frequency resources used for each of the plurality of terminals to report the access information are orthogonal to each other. For example, in the first time-frequency resource, a second time-frequency resource used to report the access information of the first terminal and a third time-frequency resource used to report access information of a second terminal are orthogonal to each other. In other words, time-frequency resources used by any two of the plurality of terminals to report access information do not overlap with each other in time frequency or frequency domain.

According to the access method provided in this embodiment of this application, the time-frequency resources used for each of the plurality of terminals to report the access information are orthogonal to each other. This can reduce a probability of a resource conflict occurred during access of the terminals, and improve communication efficiency and resource utilization.

Optionally, the second time-frequency resource corresponding to the first terminal may be indicated by at least one of the following: second identity information of the first terminal, a resource size of the first time-frequency resource, a resource size of the second time-frequency resource corresponding to the first terminal, or at least one pre-configured value. This is not limited in this embodiment of this application.

It should be noted that the second identity information of the first terminal may be understood as information that can uniquely identify the identity of the terminal in the communications domain in which the first terminal is located.

Optionally, the second identity information may include at least one of the following: a device identifier, a MAC address, a soft address, or a short address.

Optionally, the first identity information and the second identity information of the first terminal may be the same or may be different. This is not limited in this embodiment of this application.

Optionally, the first terminal may determine, in a plurality of manners, the resource size of the second time-frequency resource corresponding to the first terminal. This is not limited in this embodiment of this application.

In a possible implementation, the first terminal may determine, based on the modulation and coding information and a size of the access information, the resource size of the second time-frequency resource corresponding to the first terminal.

In a second possible implementation, before the first terminal in the at least one terminal sends the access information of the first terminal to the network control apparatus based on the access configuration information, the first terminal may receive second configuration information from the network control apparatus, where the second configuration information is used to configure the resource size of the second time-frequency resource corresponding to the first terminal.

Optionally, the access configuration information and the second configuration information may be carried in a same message, or may be carried in different messages. This is not limited in this embodiment of this application.

In a third possible implementation, the first terminal and the network control apparatus may agree in advance on the resource size of the second time-frequency resource corresponding to the first terminal.

It should be noted that the at least one pre-configured value may be a pre-configured value used to determine a second time-frequency resource corresponding to each terminal.

In a possible implementation, the at least one value may include a first value, and the first value is used to indicate a quantity of terminals.

For example, the quantity of terminals may indicate a quantity of terminals in a group corresponding to a multicast address.

For another example, the quantity of terminals may be a quantity of terminals that make an incoming call by the network control apparatus based on the resource configuration information.

Optionally, the at least one value may be pre-configured for the first terminal in a plurality of manners. This is not limited in this embodiment of this application.

In a first possible implementation, the at least one value may be pre-configured in a communications protocol, and the first terminal may obtain the at least one value based on the communications protocol.

In a second possible implementation, before the first terminal sends the access information of the first terminal to the network control apparatus based on the access configuration information, the first terminal may receive third configuration information from the network control apparatus, where the third configuration information is used to configure the at least one value.

Optionally, the access configuration information and the third configuration information may be carried in a same message, or may be carried in different messages. This is not limited in this embodiment of this application.

In a third possible implementation, the first terminal and the network control apparatus may agree on the at least one value in advance.

Optionally, the first terminal may determine, from the first time-frequency resource in a plurality of manners, the second time-frequency resource corresponding to the first terminal. This is not limited in this embodiment of this application.

In a first possible implementation, the first terminal may determine, based on the resource size of the first time-frequency resource and the resource size of the second time-frequency resource corresponding to the first terminal, the second time-frequency resource corresponding to the first terminal.

It should be noted that, because the network control apparatus and the first terminal may be produced by a same vehicle manufacturer, before the vehicle is delivered from a factory, related information (for example, the second identity information of the first terminal, the resource size of the second time-frequency resource corresponding to the first terminal, and the at least one value) used to determine the second time-frequency resource corresponding to the first terminal and a calculation rule of the second time-frequency resource may be pre-configured for the network control apparatus. Therefore, the network control apparatus does not need to perform additional signaling interaction with the first terminal to obtain the related information required for determining the second time-frequency resource corresponding to the first terminal. This can reduce signaling overheads, and reduce an access delay and improve communication efficiency.

Optionally, the network control apparatus and the first terminal may agree on a division rule and a number rule of resource blocks in the first time-frequency resource in advance, and the network control apparatus and the first terminal may determine, according to the number rule and the division rule, a number of each resource block and a resource size of each resource block in the first time-frequency resource.

In other words, the network control apparatus and the first terminal can determine, by using a similar method, the second time-frequency resource corresponding to the first terminal.

In a second possible implementation, the first terminal may determine, based on the resource size of the first time-frequency resource, the resource size of the second time-frequency resource corresponding to the first terminal, and the second identity information of the first terminal, the second time-frequency resource corresponding to the first terminal.

In a third possible implementation, the first terminal may determine, based on the second identity information of the first terminal and the first value, the second time-frequency resource corresponding to the first terminal, where the at least one value includes the first value.

According to the foregoing resource block selection method, because second identity information of each terminal is pre-configured for the network control apparatus, the first value can be appropriately set to effectively stagger time-frequency resources used by different terminals to report access information, that is, to ensure that time-frequency resources used by different terminals to report access information do not overlap each other. This can reduce a probability of a resource conflict occurred during access of the terminals, and improve communication efficiency and resource utilization.

Optionally, when the quantity of the at least one terminal is greater than 1, at least two terminals in the plurality of terminals may have different attributes, and the network control apparatus may configure, by using the resource configuration information, different sub-resources for terminals with different attributes, where the first time-frequency resource includes the sub-resources corresponding to the terminals with different attributes.

Optionally, the attribute may include at least one of a device type, a multicast address, or a device priority.

Specifically, the device type may include a microphone type, an acoustic device type, a display type, and the like. The device type is not specifically limited in this application.

It should be noted that, that multicast addresses of terminals are different may be understood as that the terminals belong to different terminal groups.

Optionally, the device priority of the terminal may be divided in a plurality of manners. This is not limited in this embodiment of this application.

In a possible implementation, the device priority may be divided based on a location area of the terminal in the cabin.

For example, a device priority of a terminal located in a front-row seating area is higher than a device priority of a terminal located in a back-row seating area.

In another possible implementation, the device priority of the terminal may be divided based on the device type of the terminal.

For example, a device priority of a display is higher than a device priority of an acoustic device, and the device priority of the acoustic device is higher than a device priority of a microphone.

In a possible implementation, for example, the plurality of terminals include a first terminal with a first attribute and a second terminal with a second attribute, the first terminal corresponds to a first time-frequency sub-resource in the first time-frequency resource, and the second terminal corresponds to a second time-frequency sub-resource in the first time-frequency resource. The first terminal sends the access information of the first terminal to the network control apparatus on the first time-frequency sub-resource. Correspondingly, the network control apparatus receives the access information of the first terminal on the first time-frequency sub-resource. Similarly, the second terminal sends the access information of the second terminal to the network control apparatus on the second time-frequency sub-resource. Correspondingly, the network control apparatus receives the access information from the second terminal on the second time-frequency sub-resource.

In another possible implementation, for example, the plurality of terminals include a first terminal and a second terminal with a first attribute, and the first attribute corresponds to a first time-frequency sub-resource in the first time-frequency resource. In this case, the first terminal sends, on a second time-frequency resource in the first time-frequency sub-resource, the access information of the first terminal to the network control apparatus. Correspondingly, the network control apparatus receives the access information of the first terminal on the second time-frequency resource. Similarly, the second terminal sends, on a third time-frequency resource in the first time-frequency sub-resource, the access information of the second terminal to the network control apparatus. Correspondingly, the network control apparatus receives the access information from the second terminal on the third time-frequency resource.

It should be noted that at least one of a time domain resource or a frequency domain resource in time-frequency sub-resources corresponding to terminals with different attributes is different.

In other words, at least one of a time domain resource or a frequency domain resource in the first time-frequency sub-resource and that in the second time-frequency sub-resource do not overlap.

According to the access method provided in this embodiment of this application, the network control apparatus configures the different time-frequency sub-resources for the terminals with different attributes, so that the terminals with the different attributes perform access on the time-frequency sub-resources corresponding to the attributes to which the terminals belong. This can reduce a probability of a resource conflict occurred during access of the terminals with different attributes, and improve communication efficiency and resource utilization.

It should be noted that for a method in which the first terminal determines, on the first time-frequency sub-resource, the second time-frequency resource corresponding to the first terminal, refer to the foregoing method for determining, on the first time-frequency resource, the second time-frequency resource corresponding to the first terminal. A difference lies only in that: The resource size of the first time-frequency resource is replaced with a resource size of the first time-frequency sub-resource. To avoid repetition, details are not described herein again.

It should be noted that descriptions are provided above by using only an example of a process in which the first terminal in the at least one terminal implements the access method in this embodiment of this application. When the quantity of the at least one terminal is greater than 1, a process in which another terminal in the at least one terminal implements the access method in this embodiment of this application is similar to that of the first terminal. To avoid repetition, details are not described herein again.

Optionally, the method may further include: The network control apparatus determines that at least one first target terminal in the at least one terminal successfully performs access.

Optionally, the network control apparatus may determine, in a plurality of manners, that the at least one first target terminal successfully performs access. This is not limited in this embodiment of this application.

In a first possible implementation, the network control apparatus may determine, based on access information of each of the at least one terminal, that the at least one first target terminal successfully performs access.

In a second possible implementation, the network control apparatus may determine, based on access information of each of the at least one first target terminal, that the at least one first target terminal successfully performs access.

Optionally, the method further includes: The network control apparatus sends indication information to the at least one first target terminal, where the indication information is used to indicate that the at least one first target terminal successfully performs access. Correspondingly, each of the at least one first target terminal receives the indication information from the network control apparatus, and determines, based on the indication information, that access succeeds.

Optionally, the network control apparatus may send the indication information to the at least one first target terminal in a plurality of manners. This is not limited in this embodiment of this application.

In a possible implementation, the network control apparatus may send the indication information to each of the at least one first target terminal.

In another possible implementation, the network control apparatus may send a system broadcast message, where the system broadcast message includes the indication information.

Optionally, the indication information may indicate, in a plurality of manners, that the at least one first target terminal successfully performs access. This is not limited in this embodiment of this application.

In a first possible implementation, the indication information may include third identity information of each of the at least one first target terminal, and the third identity information of each first target terminal is used to indicate the first target terminal.

It should be noted that the third identity information may include at least one of the following: a device identifier, a MAC address, a soft address, or a short address of the first target terminal.

Optionally, the third identity information of the first target terminal may be the same as or different from the first identity information reported when access is requested. This is not limited in this embodiment of this application.

For example, the at least one terminal includes a terminal 1, a terminal 2, a terminal 3, and a terminal 4. When the indication information includes MAC 1, MAC 2, and MAC 3, it indicates that the terminal 1 corresponding to the MAC 1, the terminal 2 corresponding to the MAC 2, and the terminal 3 corresponding to the MAC 3 successfully perform access.

In a second possible implementation, the indication information may include third identity information of each of at least one second target terminal, the third identity information of each second target terminal is used to indicate the second target terminal, and the at least one second target terminal is a terminal that fails to perform access in the at least one terminal.

For example, the at least one terminal includes a terminal 1, a terminal 2, a terminal 3, and a terminal 4. When the indication information includes MAC 2 and MAC 4, it indicates that the terminal 2 corresponding to the MAC 2 and the terminal 4 corresponding to the MAC 4 fail to perform access, and the terminal 1 corresponding to MAC 1 and the terminal 3 corresponding to MAC 3 successfully perform access.

Optionally, the method further includes: The network control apparatus sends scheduling information to the at least one first target terminal, where the scheduling information is used to indicate a fourth time-frequency resource used for each of the at least one first target terminal. Correspondingly, each first target terminal receives the scheduling information from the network control apparatus, and transmits data with the network control apparatus on the fourth time-frequency resource of the first target terminal.

Optionally, the network control apparatus may send the scheduling information to the at least one first target terminal in a plurality of manners. This is not limited in this embodiment of this application.

In a first possible implementation, the network control apparatus may send scheduling information of each first target terminal to each first target terminal, where the scheduling information of each first target terminal is used to indicate the fourth time-frequency resource of each first target terminal.

In a second possible implementation, the network control apparatus may send a system broadcast message, where the system broadcast message includes the scheduling information, and the scheduling information is used to indicate the fourth time-frequency resource for each first target terminal.

For example, the scheduling information includes a correspondence between identity information of each first target terminal and a fourth time-frequency resource of each first target terminal.

In a third possible implementation, when the at least one target terminal includes a plurality of target terminals, the network control apparatus may schedule the plurality of target terminals by group.

It should be noted that, to reduce signaling overheads, the network control apparatus may directly send the scheduling information to the at least one target terminal without sending the indication information to the at least one target terminal.

In other words, provided that the scheduling information is received, the first target terminal can determine that the first target terminal successfully performs access.

Optionally, at least one second target terminal that fails to perform access in the at least one terminal on the second time-frequency resource may initiate access to the network control apparatus again.

In a possible implementation, each of the at least one second target terminal may send access information of each second target terminal to the network control apparatus on a fifth time-frequency resource. Correspondingly, the network control apparatus receives the access information from the at least one second target terminal on the fifth time-frequency resource.

Specifically, each second target terminal may send the access information of each second target terminal to the network control apparatus on a sixth time-frequency resource corresponding to each second target terminal, where the fifth time-frequency resource includes the sixth time-frequency resource corresponding to each of the plurality of second target terminals. Correspondingly, the network control apparatus receives the access information from each second target terminal on the sixth time-frequency resource corresponding to each second target terminal.

It should be noted that, for a process in which a second target terminal sends access information of the second target terminal to the network control apparatus on the sixth time-frequency resource corresponding to the second target terminal, refer to the process in which the first terminal sends the access information of the first terminal to the network control apparatus on the second time-frequency resource corresponding to the first terminal. To avoid repetition, details are not described herein again.

Optionally, the first time-frequency resource includes the fifth time-frequency resource, or the fifth time-frequency resource is different from the first time-frequency resource.

In a first possible implementation, the first time-frequency resource may include a second time-frequency resource corresponding to each terminal and the fifth time-frequency resource.

It should be noted that a start moment of the fifth time-frequency resource in time domain is not earlier than an end moment of the second time-frequency resource corresponding to each terminal in time domain.

In a second possible implementation, when at least two terminals in the plurality of terminals have different attributes, the first time-frequency resource may include a time-frequency sub-resource corresponding to a terminal with a different attribute and the fifth time-frequency resource.

It should be noted that a start moment of the fifth time-frequency resource in time domain is not earlier than an end moment of the time-frequency sub-resource corresponding to the terminal with the different attribute in time domain.

In conclusion, the first time-frequency resource may include two phases in time domain. A first phase is used by a plurality of terminals to perform group access or batch access, and a second phase is used by a terminal that fails to perform access in the first phase to perform access again.

In a third possible implementation, the fifth time-frequency resource is a time-frequency resource other than the first time-frequency resource.

It should be noted that a start moment of the fifth time-frequency resource in time domain is not earlier than an end moment of the first time-frequency resource in time domain.

In conclusion, the first time-frequency resource is used by the plurality of terminals to perform group access or batch access, and the fifth time-frequency resource is used by the terminal that fails to perform access on the first time-frequency resource to perform access again.

Optionally, the second target terminal may determine the fifth time-frequency resource in a plurality of manners. This is not limited in this embodiment of this application.

In a possible implementation, the resource configuration information is further used to configure the fifth time-frequency resource to be used by the at least one second target terminal to perform access again.

In another possible implementation, the network control apparatus may send fourth access configuration information to the at least one second target terminal, where the fourth access configuration information is used to indicate the fifth time-frequency resource.

According to the access method provided in this embodiment of this application, because the vehicle is just powered on, there is no terminal access in the communications domain in which the network control apparatus is located, that is, there is no another terminal or service that needs to be served in the system. Therefore, the network control apparatus can calculate all the available time-frequency resources that are in the current communications domain and used for initial access, and use all the time-frequency resources for group access or batch access of the vehicular terminal. After initial access is completed, the vehicle enters the running state, and subsequent access requests comply with random distribution, that is, random access is initiated after a service of a terminal (including the vehicular terminal and/or the non-vehicular terminal that do/does not perform initial access) randomly arrives. Therefore, after the vehicle enters the running state, the terminal that subsequently requests access may perform random access in the foregoing Scenario 1 on the pre-configured time-frequency resource used for random access. This can improve resource utilization and communication efficiency while meeting access requirements of terminals in different access scenarios.

According to a second aspect, an embodiment of this application further provides an intelligent vehicle. The intelligent vehicle includes the communications system according to any one of the first aspect or the possible implementations of the first aspect.

According to a third aspect, an embodiment of this application further provides an access control method. The method is applied to a network control apparatus, and the method includes the steps performed by the network control apparatus according to any one of the first aspect or the possible implementations of the first aspect.

According to a fourth aspect, an embodiment of this application further provides an access method. The method is applied to a terminal, and the method includes the steps performed by the terminal according to any one of the first aspect or the possible implementations of the first aspect.

According to a fifth aspect, an embodiment of this application further provides an access control apparatus. The apparatus includes a communications unit and a processing unit. The processing unit is configured to control the communications unit to send access configuration information, where the access configuration information is used to configure an access manner of at least one terminal, and the access manner includes a first access manner or a second access manner. The processing unit is further configured to control the communications unit to receive access information from a first terminal, where the access information is used to request access, and the at least one terminal includes the first terminal.

Optionally, the communications unit and the processing unit are further configured to implement the method performed by the network control apparatus according to any possible implementation of the first aspect.

According to a sixth aspect, an embodiment of this application further provides an access apparatus. The apparatus includes a communications unit and a processing unit. The processing unit is configured to control the communications unit to receive access configuration information from a network control apparatus, where the access configuration information is used to configure an access manner of at least one terminal, and the access manner includes a first access manner or a second access manner. The processing unit is further configured to control, based on the access configuration information, the communications unit to send access information of a first terminal to the network control apparatus, where the access information is used to request access, and the at least one terminal includes the first terminal.

Optionally, the communications unit and the processing unit are further configured to implement the method performed by the terminal according to any possible implementation of the first aspect.

According to a seventh aspect, an embodiment of this application further provides an access control apparatus. The apparatus includes at least one processor and a communications interface. The at least one processor and the communications interface communicate with each other through an internal connection path, the at least one processor is configured to invoke instructions from the communications interface and run the instructions, and when executing the instructions, the at least one processor implements the method performed by the network control apparatus according to any one of the first aspect or the possible implementations of the first aspect.

Optionally, the access control apparatus may further include a memory, and the memory is configured to store the foregoing instructions.

In a possible implementation, the access control apparatus may be a network control apparatus, for example, a CDC.

According to an eighth aspect, an embodiment of this application further provides an access control apparatus. The apparatus includes a processor and a communications interface. The processor and the communications interface communicate with each other through an internal connection path, the processor is configured to invoke instructions from the communications interface and run the instructions, and when executing the instructions, the processor implements the method performed by the terminal according to any one of the first aspect or the possible implementations of the first aspect.

Optionally, the access apparatus may further include a memory, and the memory is configured to store the foregoing instructions.

In a possible implementation, the access control apparatus may be a network control apparatus, for example, a CDC.

According to a ninth aspect, this application further provides a computer-readable storage medium, configured to store a computer program. The computer program includes instructions used to implement the method performed by the network control apparatus or the method performed by the terminal according to any one of the first aspect or the possible implementations of the first aspect.

According to a tenth aspect, this application further provides a computer program product including instructions. The computer program product includes the instructions, and when the instructions are run on a computer or a processor, the computer or the processor is enabled to implement the method performed by the network control apparatus or the method performed by the terminal according to any one of the first aspect or the possible implementations of the first aspect.

According to an eleventh aspect, this application further provides a chip apparatus, including a communications interface and at least one processor. The communications interface and the processor communicate with each other through an internal connection path. The processor is configured to invoke instructions from the communications interface and run the instructions, and when executing the instructions, the processor implements the method performed by the network control apparatus or the method performed by the terminal according to any one of the first aspect or the possible implementations of the first aspect.

Optionally, the chip apparatus may further include a memory, and the memory is configured to store the foregoing instructions.

DESCRIPTION OF EMBODIMENTS

The following describes the technical solutions of this application with reference to accompanying drawings.

Figure 1:
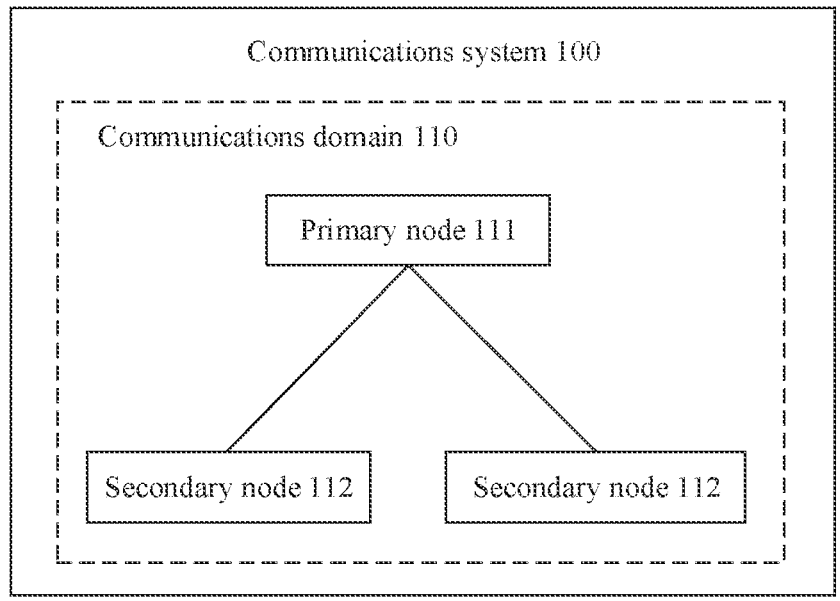
FIG. 1 is a schematic block diagram of a communications system 100 according to an embodiment of this application.

FIG. 1 is a schematic block diagram of a communications system 100 according to an embodiment of this application. The communications system 100 includes at least one communications domain. FIG. 1 shows a communications domain 110. The communications domain 110 includes a primary node 111 and at least one secondary node 112.

It should be noted that the primary node 111 in this embodiment of this application indicates an apparatus that can communicate with the secondary node 112 and has a capability of managing the secondary node 112 (for example, scheduling a resource for the secondary node 112).

It should be further noted that the secondary node 112 in this embodiment of this application indicates an apparatus that can follow management of the primary node 111 and has a capability of performing communication on the resource allocated by the primary node 111.

Optionally, the communications domain 110 is applicable to a cockpit (also referred to as a cabin) of a motor vehicle (for example, an intelligent vehicle, an electric vehicle, or a digital vehicle).

In a possible implementation, the primary node 111 may be a network control apparatus, and the secondary node 112 may be a terminal.

Optionally, the network control apparatus may be in a plurality of forms. This is not limited in this embodiment of this application.

In a possible implementation, the network control apparatus may be an independent device.

In another possible implementation, the network control apparatus may be integrated into another device as a function module or a chip apparatus.

It should be noted that the network control apparatus in this embodiment of this application may also be referred to as an access device or a radio access network device, may be an evolved NodeB (evolved NodeB, eNB or eNodeB) in a long term evolution (long term evolution, LTE) system, or may be a radio controller in a cloud radio access network (cloud radio access network, CRAN) scenario. Alternatively, the access device may be a relay station, an access point, a vehicular device, a wearable device, an access device in a 5G network, a network device in a future evolved public land mobile network (public land mobile network, PLMN), may be an access point (access point, AP) in a wireless local area network (wireless local area network, WLAN), may be a gNB in a new radio (new radio, NR) system, or the like. This is not limited in this embodiment of this application.

Optionally, the access device is a device in a radio access network (radio access network, RAN), or a RAN node that enables the terminal to access a wireless network. By way of example, and not limitation, the access network device may be a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), a wireless fidelity (wireless fidelity, Wi-Fi) access point (access point, AP), or the like. In a network structure, the network device may include a centralized unit (centralized unit, CU) node or a distributed unit (distributed unit, DU) node, a RAN device including a CU node and a DU node, or a RAN device including a control plane CU node (CU-CP node), a user plane CU node (CU-UP node), and a DU node.

Optionally, the terminal may be in a plurality of forms. This is not limited in this embodiment of this application.

In a possible implementation, the terminal may be an independent device.

In another possible implementation, the terminal may be integrated into another device as a function module or a chip apparatus.

It should be noted that the terminal in this embodiment of this application may be a device that provides voice/data connectivity for a user, for example, a handheld device or a vehicular device with a wireless connection function. Currently, some examples of the terminal are a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in self driving (self driving), a cellular phone, a cordless phone, a session initiation protocol (session initiation protocol, SIP) phone, a personal digital assistant (personal digital assistant, PDA), a handheld device with a wireless communication function, a computing device, a vehicular device, a wearable device, a terminal device in a 5G network, and a terminal device in a future evolved public land mobile communications network (public land mobile network, PLMN). This is not limited in this embodiment of this application.

It should be further noted that the wearable device may also be referred to as a wearable intelligent device, and is a general term of wearable devices such as glasses, gloves, watches, clothes, and shoes that are developed by applying wearable technologies in intelligent designs of daily wear. The wearable device is a portable device that can be directly worn on the body or integrated into clothes or an accessory of a user.

It should be further noted that, in this embodiment of this application, terminals are divided into a "vehicular terminal" and a "non-vehicular terminal" based on relationships between the terminals and the cockpit.

The "vehicular terminal", also referred to as an on-board unit (on-board unit, OBU), indicates a device that is integrated or installed in a cockpit domain and that belongs to a part of the cockpit domain, for example, a vehicular acoustic device, a vehicular microphone, or a vehicular display. Generally, the vehicular terminal may be a device installed (factory-installed) on a vehicle by a vehicle manufacturer before delivery of the vehicle.

The "non-vehicular terminal" indicates a device that is placed in the cockpit domain and that can communicate with or connect to another device in the cockpit domain, but does not belong to a part of the cockpit, for example, an intelligent terminal, a tablet computer, a Bluetooth headset, or a wearable device of a user.

In a possible implementation, the network control apparatus in this embodiment of this application may be a cockpit domain controller (cockpit domain controller, CDC), and the at least one terminal may include at least one of the vehicular terminal or the non-vehicular terminal.

For example, the CDC may communicate with the vehicular display, the intelligent terminal, and the vehicular acoustic device.

It should be noted that the vehicle manufacturer may integrate the CDC and the at least one vehicular terminal into the vehicle, for example, in the cabin domain of the vehicle, in a vehicle manufacturing process.

In another possible implementation, the network control apparatus in this embodiment of this application may be an intelligent terminal, and the at least one terminal may include at least one of the vehicular terminal or the non-vehicular terminal.

For example, the intelligent terminal may communicate with the vehicular acoustic device, the Bluetooth headset, and the vehicular microphone.

Optionally, the network control apparatus may communicate with the terminal in a plurality of manners. This is not limited in this embodiment of this application.

In a possible implementation, the network control apparatus may communicate with the terminal in a wired manner.

It should be noted that the foregoing wired manner may indicate implementing communication through a data cable connection or through an internal bus connection.

In another possible implementation, the network control apparatus may communicate with the terminal in a wireless manner.

It should be noted that the foregoing wireless manner may indicate implementing communication through a communications network. The communications network may be a local area network, or may be a wide area network transferred by using a relay (relay) device, or may include a local area network and a wide area network. For example, when the communications network is a local area network, the communications network may be a Wi-Fi hotspot network, a Wi-Fi P2P network, a Bluetooth network, a ZigBee network, a near field communication (near field communication, NFC) network, or a possible future universal short-range communications network. For example, when the communications network is a wide area network, the communications network may be a 3rd-generation mobile communication technology (3rd-generation wireless telephone technology, 3G) network, a 4th-generation mobile communication technology (the 4th-generation mobile communication technology, 4G) network, a 5th-generation mobile communication technology (5th-generation mobile communication technology, 5G) network, a PLMN, or an internet. This is not limited in this embodiment of this application.

Figure 2:
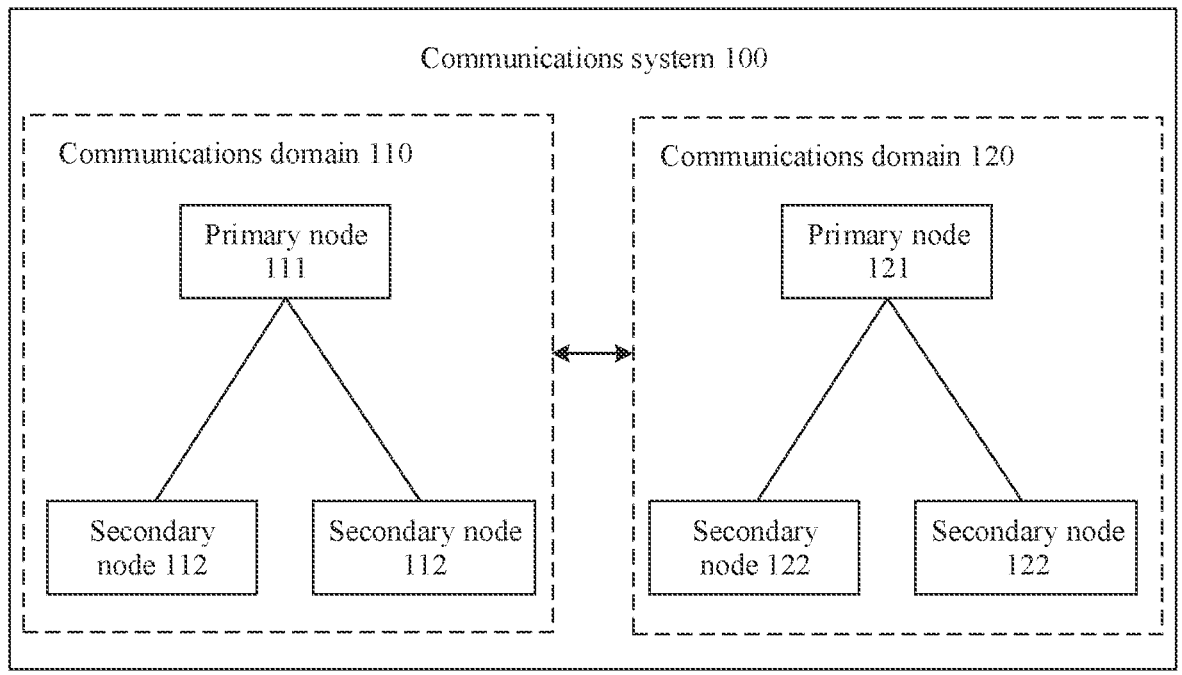
FIG. 2 is another schematic block diagram of a communications system 100 according to an embodiment of this application.

It should be noted that FIG. 1 shows only an example of the communications domain 110, and the communications system 100 may further include another communications domain. As shown in FIG. 2, the communications system 100 may further include a communications domain 120, the communications domain 120 includes a primary node 121 and at least one secondary node 122, and the primary node 121 and the at least one secondary node 122 may communicate with each other.

It should be noted that the communications domain 110 may communicate with the communications domain 120.

For example, two primary nodes belonging to different communications domains may communicate with each other.

Optionally, the communications domain 120 is applicable to a cockpit (also referred to as a cabin) of a motor vehicle (for example, an intelligent vehicle, an electric vehicle, or a digital vehicle).

Optionally, the communications domain 110 and the communications domain 120 may belong to different domains in a same vehicle (or a cabin). For example, the communications domain 110 is an entertainment domain, and the communications domain 120 is a driving domain. Alternatively, the communications domain 110 and the communications domain 120 may belong to different vehicles (cabins). This is not limited in this embodiment of this application.

In an existing wireless communications system, a terminal accesses a network device in a conventional random access manner, for example, a contention-based random access manner. Access requirements comply with Poisson distribution due to random arrival of terminals, that is, access requests of terminals are approximately average in time. When the terminals request random access, there is another terminal that is being served in the system. Therefore, most available time-frequency resources in the system are used to maintain and guarantee a service of the another terminal, only a limited fixed time-frequency resource is allocated for random access, and the limited time-frequency resource can carry only very limited terminal access at a time.

In a cockpit communications domain, there are two terminal access scenarios:

Scenario 1: When a vehicle is just powered on, a plurality of vehicular terminals in a cockpit all initiate access requests to the CDC in a short time. This is a scenario in which the terminals perform batch access or group access.

In Scenario 1, when conventional random access is used, the plurality of terminals perform contention-based random access on the fixed and limited time-frequency resource. A severe resource collision may be generated and an access failure is caused.

Scenario 2: After a vehicle runs stably, a non-vehicular terminal needs to access a network, or a link of a vehicular terminal is faulty and the vehicular terminal needs to access the network again. This is a terminal random access scenario.

In Scenario 2, when conventional random access is used, the terminal needs to send a physical random access channel (physical random access channel, PRACH) sequence to the CDC on the fixed and limited time-frequency resource for request access. However, parsing complexity of the PRACH is relatively high for the CDC.

In conclusion, the existing random access method cannot ensure reliable communication of the terminal because the terminal cannot access the network based on a requirement of the terminal in the foregoing different access scenarios.

Embodiments of this application provide an access method and apparatus, to flexibly access a network based on a requirement of a terminal in different access scenarios.

Figure 3:
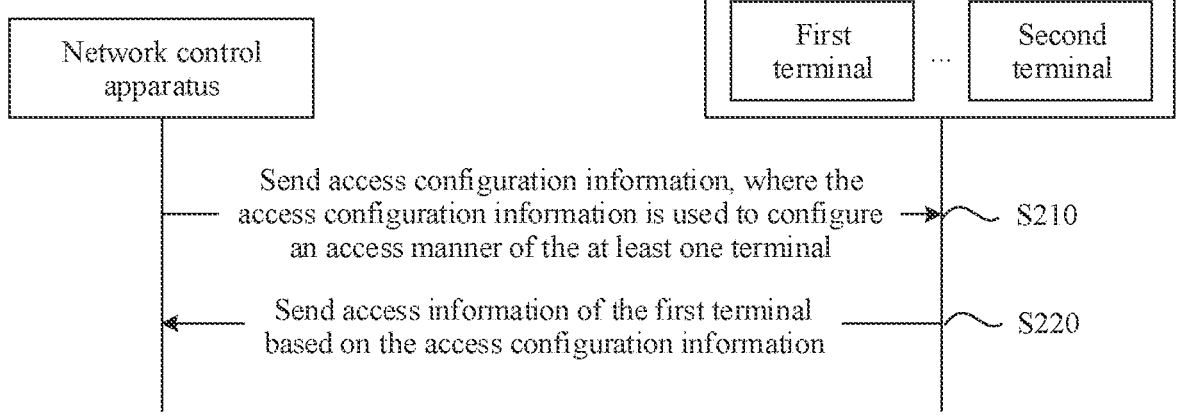
FIG. 3 is a schematic flowchart of an access method 200 according to an embodiment of this application.

FIG. 3 is a schematic flowchart of an access method 200 according to an embodiment of this application. The method 200 is applied to the communications system 100 shown in FIG. 1, for example, the communications domain 110 in the communications system 100, and is applicable to a cockpit of a vehicle.

S210: A network control apparatus sends access configuration information, where the access configuration information is used to configure an access manner of at least one terminal, and the access manner includes a first access manner or a second access manner. Correspondingly, each of the at least one terminal receives the access configuration information from the network control apparatus.

Optionally, the network control apparatus and the at least one terminal each may be in a plurality of forms. This is not limited in this embodiment of this application.

In a possible implementation, the network control apparatus may be a CDC in a cabin, the at least one terminal may be at least one vehicular terminal in the cabin, and a vehicle manufacturer integrates the CDC and the at least one vehicular terminal into a vehicle to which the cabin belongs.

In another possible implementation, the network control apparatus may be a CDC in a cabin, and the at least one terminal may include at least one of a vehicular terminal or a non-vehicular terminal in the cabin.

It should be noted that before S210, the at least one terminal is in a non-connected state, that is, none of the at least one terminal accesses a network or establishes a connection to the network control apparatus, or an established connection to the network control apparatus needs to be re-established after being disconnected.

It should be further noted that the non-connected state in this embodiment of this application may include an idle state, a dormant state, or an inactive state.

It should be noted that the at least one terminal may belong to at least one terminal type.

Optionally, the terminal type may include a first terminal type or a second terminal type. This is not limited in this embodiment of this application.

In a possible implementation, the first terminal type may be a vehicular terminal type, and the second terminal type may be a non-vehicular terminal type.

For example, the vehicular terminal may include a vehicular speaker, a vehicular display, or a vehicular microphone.

For another example, the non-vehicular terminal may include an intelligent terminal, a Bluetooth headset, or a tablet computer.

Optionally, the first access manner may include a contention-based access manner or a random access manner, and the first access manner is used to indicate that access of terminals of the first terminal type and the second terminal type is allowed.

Optionally, the second access manner may include contention-free access, a group access manner, or a batch access manner, and the second access manner is used to indicate that access of a terminal of only the first terminal type is allowed.

It should be noted that when the access manner indicated by the access configuration information is the first access manner, the terminal of the first terminal type and the terminal of the second terminal type perform access on a pre-configured first time-frequency resource in a random access manner described below. The terminal needs to contend for the resource in the random access process.

It should be further noted that when the access manner indicated by the access configuration information is the second access manner, the terminal of the first terminal type performs access, in a group access manner or a batch access manner described below, on a first time-frequency resource indicated by the network control apparatus. The terminal does not need to contend for the resource in the group access or batch access process.

Optionally, the access configuration information may be used to configure the access manner in a plurality of manners. This is not limited in this embodiment of this application.

In a first possible implementation, the access configuration information may include at least one bit, and the at least one bit is used to configure the access manner.

In other words, the access configuration information may directly indicate the access manner.

For example, the at least one bit includes one bit. When the bit is "1", the at least one terminal is configured to use the first access manner. When the bit is "0", the at least one terminal is configured to use the second access manner.

In a second possible implementation, the access configuration information may include first state information, where the first state information is used to indicate a state of the network control apparatus, and the state of the network control apparatus may indicate the access manner of the at least one terminal.

In other words, the access configuration information may directly indicate the state of the network control apparatus, and indirectly indicate the access manner of the at least one terminal by using the state of the network control apparatus.

Optionally, the state of the network control apparatus and the access manner of the terminal may be in a one-to-one correspondence, or may be in a many-to-one relationship. This is not limited in this embodiment of this application.

In a first possible implementation, the network control apparatus may have a first state or a second state, the first state corresponds to the first access manner, and the second state corresponds to the second access manner.

For example, the first state is a "system preparation state", and the second state is a "system running state". When the vehicle is just powered on, the CDC is in the "system preparation state". In this state, access of the terminal of only the first type is allowed, and access of the terminal of the second type is not allowed, that is, the first state corresponds to the first access manner. After the vehicle runs stably, the CDC is in the "system running state". In this state, access of the terminal of the first type and the terminal of the second type is allowed, that is, the second state corresponds to the second access manner.

In a second possible implementation, the state of the network control apparatus may include a first state, a second state, a third state, or a fourth state, where the first state and the third state correspond to the first access manner, and the second state and the fourth state correspond to the second access manner.

For example, the first state is a "system preparation state", the second state is a "system running state", the third state is a "state in which access of the terminal of only the first type is allowed", and the fourth state is a "state in which access of the terminal of the first type and the terminal of the second type is allowed". When the vehicle is just powered on, the CDC is in the "system preparation state" or the "state in which access of the terminal of only the first type is allowed". In the two states, the CDC allows access of the terminal of only the first type, and does not allow access of the terminal of the second type, that is, the first state and the third state correspond to the first access manner. After the vehicle runs stably, the CDC is in the "system preparation state" or the "state in which access of the terminal of the first type and the terminal of the second type is allowed". In the two states, the CDC allows access of the terminal of the first type and the terminal of the second type, that is, the second state and the fourth state correspond to the second access manner.

Optionally, the network control apparatus may send the access configuration information in a plurality of manners. This is not limited in this embodiment of this application.

In a first possible implementation, the network control apparatus may send the access configuration information to each of the at least one terminal.

In a second possible implementation, the network control apparatus may send a multicast message, where the multicast message includes the access configuration information and a multicast address.

It should be noted that the multicast address is an address of a group of terminals, and a message sent to this address may be identified and received by the group of terminals.

For example, the plurality of terminals include a terminal 1 and a terminal 2, the terminal 1 and the terminal 2 belong to a first terminal group, and the multicast message sent by the network control apparatus includes the resource configuration information and a multicast address of the first terminal group. Correspondingly, the terminal 1 and the terminal 2 determine that the terminal 1 and the terminal 2 belong to the first terminal group corresponding to the multicast address, and receive the multicast message.

Optionally, the multicast message may further include terminal quantity information, and the terminal quantity information is used to indicate a quantity of terminals corresponding to the multicast address.

In a third possible implementation, the network control apparatus may send a system broadcast message, where the system broadcast message includes the access configuration information.

For example, the system broadcast message may be a master information block (master information block, MIB) message or a system information block (system information block, SIB) message.

According to the access method provided in this embodiment of this application, the network control apparatus includes the access configuration information in the multicast message or the broadcast message. This can reduce a transmission delay, and improve access efficiency.

S220: A first terminal in the at least one terminal sends access information of the first terminal to the network control apparatus based on the access configuration information, where the access information is used to request access. Correspondingly, the network control apparatus receives the access information from the first terminal.

The following separately describes an implementation process of S220 in two different scenarios.

Scenario 1: The access manner is the first access manner (for example, random access or contention-based access), the first access manner indicates that access of the terminal of the first terminal type and the terminal of the second terminal type is allowed, and the first terminal belongs to the first terminal type or the second terminal type.

Optionally, in Scenario 1, S220 may include: The first terminal sends the access information of the first terminal to the network control apparatus on the pre-configured first time-frequency resource in the first access manner. Correspondingly, the network control apparatus receives the access information of the first terminal on the first time-frequency resource.

Before S220, the first terminal and the network control apparatus need to first determine the first time-frequency resource.

Optionally, the first terminal or the network control apparatus may determine the first time-frequency resource in a plurality of manners. This is not limited in this embodiment of this application.

In a first possible implementation, the network control apparatus may send first resource configuration information to the first terminal in advance, where the first resource configuration information is used to configure the first time-frequency resource. Correspondingly, the first terminal may receive the first resource configuration information from the network control apparatus, and determine the first time-frequency resource based on the first resource configuration information.

In a second possible implementation, the first terminal and the network control apparatus may agree on locations of the first time-frequency resource in time domain and frequency domain in advance.

In a third possible implementation, the first terminal and the network control apparatus may agree in advance on a rule for determining a location of the first time-frequency resource. The first terminal and the network control apparatus may determine the first time-frequency resource according to the rule.

It should be noted that the first time-frequency resource is a pre-configured, limited, and fixed time-frequency resource. Specifically, the first time-frequency resource may occupy a time domain resource unit (or a time domain length) with a fixed location and a fixed size, and a frequency domain resource unit (or a frequency domain bandwidth) with a fixed location and a fixed size.

It should be further noted that the time domain resource unit may be understood as a scheduling granularity in time domain, for example, a minimum granularity, and the frequency domain resource unit may be understood as a scheduling granularity in frequency domain.

Specifically, the time domain resource unit may be but is not limited to a slot (slot) or a frame, and the frame or the slot includes several symbols (symbol). For example, the symbol is an orthogonal frequency division multiplexing (orthogonal frequency division multiplexing, OFDM) symbol. The frequency domain resource unit may be but is not limited to one or more subcarriers.

For example, it is agreed in a communications protocol that the first time-frequency resource occupies two fixed symbols (symbol) in each slot (slot) in time domain, and occupies two fixed subcarriers (subcarrier) in system bandwidth in frequency domain.

For another example, it is agreed in a communications protocol that the first time-frequency resource occupies one or more fixed resource blocks in an available time-frequency resource of a system.

Optionally, the access information of the first terminal may be represented in a plurality of manners. This is not limited in this embodiment of this application.

In a possible implementation, the access information of the first terminal may include a first identifier, and the first identifier belongs to a pre-configured identifier set.

In other words, the network control apparatus and the first terminal may pre-configure the identifier set. When receiving an identifier belonging to the identifier set, the network control apparatus may determine that the identifier corresponds to a terminal that requests access.

In another possible implementation, the access information of the first terminal may include a first address, and the first address belongs to a pre-configured address set.

In other words, the network control apparatus and the first terminal may pre-configure the address set. When receiving an address belonging to the address set, the network control apparatus may determine that the address corresponds to a terminal that requests access.

For example, the address set pre-configured by the network control apparatus and the first terminal includes an address 1 to an address 64. The terminal randomly selects an address from the address set, for example, an address 3, and sends the access information to the network control apparatus on the pre-configured first time-frequency resource, where the access information includes the address 3. Correspondingly, the network control apparatus receives, on the first time-frequency resource, the access information from the first terminal; and determines, based on the address 3 in the access information, that a terminal requests access.

Optionally, the first terminal may pre-configure the identifier set (or the address set) in a plurality of manners. This is not limited in this embodiment of this application.

In a first possible implementation, the identifier set (or the address set) may be predefined in a communications protocol, and the first terminal and the network control apparatus may determine the identifier set (or the address set) based on the communications protocol.

In a second possible implementation, the network control apparatus may send first configuration information to the first terminal in advance, where the first configuration information is used to configure the identifier set (or the address set). Correspondingly, the first terminal receives the first configuration information from the network control apparatus, and configures the identifier set (or the address set) based on the first configuration information.

In a third possible implementation, the first terminal and the network control apparatus may agree on the identifier set (or the address set) in advance.

It should be noted that, in an existing random access method, a terminal needs to send a PRACH sequence to a network on a fixed and limited time-frequency resource to request access. Because a PRACH belongs to a signal, parsing complexity of a network device is relatively high.

According to the access method provided in this embodiment of this application, the first terminal sends the network control apparatus the access information in place of a PRACH to request access, where the access information belongs to data. This can reduce parsing complexity of the network control apparatus, and improve communication efficiency.

Because the access information of the first terminal is used to request access, the network control apparatus can only know, based on the access information, that a terminal requests access, but the network control apparatus does not know a real identity of the terminal. Therefore, the network control apparatus needs to determine the real identity of the terminal that requests access.

Optionally, the method may further include: The network control apparatus sends an identity information request to the first terminal based on the access information of the first terminal, where the identity information request is used to request first identity information, and the first identity information is used to identify the first terminal.

Correspondingly, the first terminal receives the identity information request from the network control apparatus, and sends the first identity information to the network control apparatus based on the identity information request.

Correspondingly, the network control apparatus receives the first identity information from the first terminal.

Optionally, the identity information request may be used to indicate that the network control apparatus requests the first identity information, and the identity information request includes identity information of the network control apparatus.

It should be noted that the identity information of the network control apparatus may be understood as information that can uniquely identify the network control apparatus in a communications domain in which the network control apparatus is located. The first identity information of the first terminal may be understood as information that can uniquely identify the terminal in a communications domain in which the first terminal is located.

Optionally, the identity information (for example, the identity information of the network control apparatus or the first identity information of the terminal) in this embodiment of this application may include at least one of the following: a device identifier, a MAC address, a soft address, or a short address.

It should be noted that the device identifier is a string of digits or a serial number that can uniquely identify the terminal, for example, an international mobile equipment identity (international mobile equipment identification number, IMEI) or a mobile equipment identifier (mobile equipment identifier, MEID).

It should be further noted that the MAC address is an address used at a media access layer, and is also referred to as a physical address, or a hardware address.

It should be further noted that the soft address may be an address that is allocated by the network control apparatus to the first terminal during previous access of the terminal and that can uniquely identify the terminal in the communications domain.

It should be further noted that the short address may be an address obtained based on a part of at least one of the device identifier, the MAC address, or the soft address.

For example, the network control apparatus may generate the short address by using 10 least significant bits of any one of the foregoing addresses of the first terminal, and the generated short address can uniquely identify the first terminal in the communications domain.

In a possible implementation, for example, the identity information is a device identification code. The network control apparatus and the first terminal may agree in advance on an encoding rule of the device identification code, that is, agree in advance that different fields in the device identification code have different meanings, and obtain the identity information of the network control apparatus by parsing some or all fields.

Optionally, the identity information may include at least one field. The network control apparatus and the first terminal may define meanings of different fields in a plurality of manners. This is not limited in this embodiment of this application.

In a possible implementation, the identity information may include a first field, and the first field is used to indicate a device type.

For example, the first field includes two bits. "00" indicates a CDC, "01" indicates a vehicular terminal, and "10" indicates a "non-vehicular terminal".

In another possible implementation, the identity information may include a second field, and the second field is used to indicate a device function.

For example, the second field includes one bit. "1" indicates a primary node, and "0" indicates a secondary node.

In still another possible implementation, the identity information may include a third field, and the third field is used to indicate a device number.

For example, the third field includes three bits. "010" indicates that the number is 2, "100" indicates that the number is 4, and "111" indicates that the number is 7.

Optionally, the identity information request may further carry second resource configuration information, where the second resource configuration information is used to configure a time-frequency resource used for the first identity information. Correspondingly, the first terminal may send the first identity information to the network control apparatus on the time-frequency resource indicated by the second resource configuration information.

It should be noted that, after receiving the first identity information, the network control apparatus may establish a correspondence between the first identity information and the first address, that is, determine the real identity of the first terminal.

In other words, if the network control apparatus successfully obtains the first identity information through parsing, the first terminal successfully performs access.

Optionally, when determining that the first terminal successfully performs access, the network control apparatus may send scheduling information to the first terminal, where the scheduling information is used to indicate a time-frequency resource to be used by the first terminal to transmit data. Correspondingly, the first terminal receives the scheduling information from the network control apparatus, and transmits data with the network control apparatus on the time-frequency resource indicated by the scheduling information.

Optionally, before the network control apparatus sends the scheduling information to the first terminal, the network control apparatus may send first indication information to the first terminal, where the first indication information is used to indicate that the first terminal successfully performs access.

It should be noted that the scheduling information may also be used to indicate that the first terminal successfully performs access. That is, the network control apparatus does not need to separately send the first indication information to indicate that the first terminal successfully performs access, and the first terminal can determine that the first terminal successfully performs access, provided that the first terminal receives the scheduling information.

It should be further noted that, if the network control apparatus fails to obtain the first identity information through parsing, for example, fails to obtain the first identity information because the network control apparatus fails to obtain the access information of the first terminal through parsing, the first terminal fails to perform access.

Optionally, when determining that the first terminal fails to perform access, the network control apparatus may send second indication information to the first terminal, where the second indication information is used to indicate that the first terminal fails to perform access. Correspondingly, the first terminal may receive the second indication information from the network control apparatus, and initiate random access again on the first time-frequency resource based on the second indication information.

It should be noted that a process in which the first terminal performs access again is similar to the process in the method 200. To avoid repetition, details are not described herein again.

Optionally, after determining that the first terminal successfully performs access, to avoid an address (or identifier) conflict caused because the first terminal and another terminal that requests access select a same address in the address set (or a same identifier in the identifier set), the network control apparatus may re-allocate a new address that does not belong to the address set (or a new identifier that does not belong the identifier set) to the first terminal, and perform subsequent data transmission based on the new address (or the new identifier).

In a first possible implementation, the network control apparatus may send address information to the first terminal, where the address information is used to indicate to update the first address to a second address, the address information carries the second address, and the second address does not belong to the address set.

Correspondingly, the first terminal may receive the address information from the network control apparatus, and update the first address to the second address based on the address information.

In a second possible implementation, the network control apparatus may send identifier information to the first terminal, where the identifier information is used to indicate to update the first identifier to a second identifier, the identifier information carries the second identifier, and the second identifier does not belong to the identifier set.

Correspondingly, the first terminal may receive the identifier information from the network control apparatus, and update the first identifier to the second identifier based on the identifier information.

The following continues to describe an implementation process of S220 in Scenario 2. It should be noted that the implementation process in the foregoing Scenario 1 and the implementation process in the following Scenario 2 are independent of each other.

Scenario 2: The access manner is the second access manner (for example, group access, batch access, or contention-free access), the second access manner indicates that access of the terminal of only the first terminal type is allowed, and the first terminal is the terminal of the first terminal type.

Optionally, the access configuration information is further used to configure the first time-frequency resource to be used by the at least one terminal to perform access in the second access manner.

Optionally, in Scenario 2, S220 may include: The first terminal sends the access information of the first terminal to the network control apparatus on the first time-frequency resource in the second access manner. Correspondingly, the network control apparatus receives the access information from the first terminal on the second time-frequency resource.

Optionally, before S210, the network control apparatus needs to first determine the first time-frequency resource.

In a possible implementation, the first time-frequency resource is an available time-frequency resource in the communications domain in which the network control apparatus is located. Compared with a limited and fixed time-frequency resource pre-configured in an existing random access manner, the available time-frequency resource can provide more sufficient resources to meet group access of a plurality of terminals.

For example, the first time-frequency resource may include all available time-frequency resources in the communications domain in which the network control apparatus is located.

It should be noted that all the available time-frequency resources in this embodiment of this application may be referred to as all time-frequency resources that may be used for initial access. Further, all the time-frequency resources occupy at least one time domain resource unit (or a first time domain length) and at least one frequency domain resource unit (or a first frequency domain bandwidth). Because when the vehicle is just powered on, there is no vehicular device access. All the foregoing available time-frequency resources may be used as access resources.

Optionally, the at least one time domain resource unit (or the first time domain length) may be consecutive or discrete, or the at least one frequency domain resource unit (or the first frequency domain bandwidth) may be consecutive or discrete. This is not limited in this embodiment of this application.

It should be noted that all the available time-frequency resources or all the time-frequency resources used for initial access are all available time-frequency resources in the communications domain that are used to transmit data, that is, time-frequency resources of a data channel.

Optionally, time domain resources in all the time-frequency resources used for initial access may have a limited length.

In a possible implementation, after the plurality of terminals complete initial access on all the time-frequency resources used for initial access, the network control apparatus may send a system broadcast message used to indicate that initial access is completed. Correspondingly, a subsequent terminal having an access requirement performs, according to the existing random access method, random access on the pre-configured limited time-frequency resource used for random access.

It should be further noted that all the available time-frequency resources or all the time-frequency resources used for initial access do not include a time-frequency resource of a symbol (for example, a symbol carrying a pilot signal, a synchronization signal, a control signal, or a broadcast signal) that is available in the communications domain and that is used to carry system control plane overheads.

In other words, all the available time-frequency resources or all the time-frequency resources used for initial access do not include a time-frequency resource used for control information or a control signal. The control information herein may include control signaling used for scheduling data, such as broadcast channel information and data feedback information. The control signal herein may include a synchronization signal, an access channel signal, an SRS, a DMRS, or the like.

In the access method provided in this embodiment of this application, in the scenario of group access or batch access, because the vehicle is just powered on, there is no terminal access in the communications domain in which the network control apparatus is located, and the network control apparatus can calculate or determine all the available time-frequency resources in the current communications domain, and allocate all the time-frequency resources to these terminals for group access or batch access. This can meet a requirement of group access or batch access and reduce a probability of a resource conflict occurred during access of the plurality of terminals.

Optionally, the network control apparatus may determine the first time-frequency resource in a plurality of manners. This is not limited in this embodiment of this application.

In a possible implementation, for example, the network control apparatus and the at least one terminal belong to a first communications domain. The network control apparatus may receive a broadcast message sent by a second network control apparatus in a second communications domain, where the broadcast message is used to indicate all time-frequency resources occupied by the second communications domain. The network control apparatus may determine the first time-frequency resource based on all the time-frequency resources occupied by the second communications domain.

Optionally, the first communications domain and the second communications domain may belong to a same cabin or different cabins. This is not limited in this embodiment of this application.

It should be noted that a manner in which the network control apparatus determines the first time-frequency resource is described above by using only an example in which the network control apparatus determines the first time-frequency resource based on all the time-frequency resources occupied by the second communications domain. However, this embodiment of this application is not limited thereto.

Optionally, the network control apparatus may determine the first time-frequency resource based on all time-frequency resources occupied by a plurality of communications domains. The plurality of communications domains include the second communications domain. This is not limited in this embodiment of this application.

In another possible implementation, the network control apparatus may obtain the first time-frequency resource by using a higher-layer network device, and the higher-layer network device can calculate and allocate, to each network control apparatus, all available time-frequency resources in a communications domain in which the network control apparatus is located. Optionally, the network control apparatus receives indication information from another network device, where the indication information is used to indicate the first time-frequency resource.

For example, the network control apparatus is an access network device. The network control apparatus may send a resource request to a core network device, where the resource request is used to request all time-frequency resources currently available to the network control apparatus; and receive resource information sent by the core network device, where the resource information is used to indicate the first time-frequency resource.

According to the access method provided in this embodiment of this application, in the scenario of group access or batch access, because the vehicle is just powered on, there is no terminal access in the communications domain in which the network control apparatus is located, that is, there is no another terminal or service that needs to be served in the system. Therefore, the network control apparatus can calculate all the available time-frequency resources in the current communications domain, and use all the time-frequency resources for group access or batch access of terminals. This can reduce a probability of a resource conflict occurred during access of the terminals, and improve communication efficiency and resource utilization.

Optionally, the access information may be carried in an access message, where the access message is obtained by performing modulation and coding on the access information by using predefined modulation and coding information, and the modulation and coding information includes at least one of a modulation and coding scheme, a channel coding scheme, and a bit rate.

Correspondingly, the network control apparatus may decode the access message based on the pre-configured modulation and coding information, to obtain the access information.

Optionally, the network control apparatus and the first terminal may obtain the modulation and coding information in a plurality of manners. This is not limited in this embodiment of this application.

In a first possible implementation, the modulation and coding information may be pre-configured in a communications protocol, and the first terminal and the network control apparatus may determine the modulation and coding information based on the communications protocol.

In a second possible implementation, the network control apparatus may send first configuration information to the first terminal in advance, where the first configuration information is used to configure the modulation and coding information. Correspondingly, the first terminal receives the first configuration information from the network control apparatus, and configures the modulation and coding information based on the first configuration information.

Optionally, the access configuration information and the first configuration information may be carried in a same message, or may be carried in different messages. This is not limited in this embodiment of this application.

In a third possible implementation, the first terminal and the network control apparatus may agree on the modulation and coding information in advance.

Optionally, the access information of the first terminal may include at least one of the first identity information or the state information. This is not limited in this embodiment of this application.

It should be noted that the first identity information may be understood as information that can uniquely identify the identity of the first terminal in the communications domain in which the first terminal is located.

Optionally, the identity information (for example, the first identity information) in this embodiment of this application may include at least one of the following: a device identifier, a MAC address, a soft address, or a short address.

For example, the first identity information may include a MAC address, or include a MAC address+a device identifier.

It should be noted that the short address may be an address obtained by truncating a part of the device identifier, the MAC address, and the soft address.

For example, the network control apparatus may generate the short address by truncating 10 least significant bits of any one of the foregoing addresses of the first terminal, and the generated short address can uniquely identify the first terminal in the communications domain.

Optionally, the identity information (for example, the first identity information) in this embodiment of this application may include at least one field. The network control apparatus and the first terminal may define meanings of different fields in a plurality of manners. This is not limited in this embodiment of this application.

In a possible implementation, the identity information may include a first field, and the first field is used to indicate a device type.

For example, the first field includes two bits. "00" indicates a CDC, "01" indicates a vehicular terminal, and "10" indicates a "non-vehicular terminal".

In another possible implementation, the identity information may include a second field, and the second field is used to indicate a device function.

For example, the second field includes one bit. "1" indicates a primary node, and "0" indicates a secondary node.

In still another possible implementation, the identity information may include a third field, and the third field is used to indicate a device number.

For example, the third field includes three bits. "010" indicates that the number is 2, "100" indicates that the number is 4, and "111" indicates that the number is 7.

It should be noted that the state information may be understood as information that can indicate a current state of the first terminal.

Optionally, the first terminal may include a first state or a second state.

For example, the first state may be a "normal state", and the second state may be an "abnormal state".

Optionally, when the state information indicates that the state of the first terminal is the "abnormal state", the state information may further include exception indication information, and the exception indication information is used to indicate an exception cause of the first terminal.

Optionally, the state information may indicate the state of the first terminal in a plurality of manners. This is not limited in this embodiment of this application.

In a possible implementation, the state information may include at least one bit, and the state information may indicate the current state of the first terminal by using the at least one bit.

For example, the state information includes one bit. When the bit is "1", the "normal state" is indicated. When the bit is "0", the "abnormal state" is indicated.

In another possible implementation, the state information may include the exception indication information, and the exception indication information is used to indicate that the state of the first terminal is the "abnormal state" and indicate the exception cause.

It should be noted that, because a terminal may be in the abnormal state after being powered on, for example, a device fault, a line fault, or a network fault, the network control apparatus may agree with the at least one terminal in advance that only a terminal (for example, the first terminal) in the normal state reports access information to the network control apparatus, and the terminal in the abnormal state does not need to report access information.

Optionally, the first terminal may send the access information of the first terminal to the network control apparatus on the first time-frequency resource in a plurality of manners. This is not limited in this embodiment of this application.

In a first possible implementation, the first terminal may send the access information of the first terminal to the network control apparatus on the first time-frequency resource in the contention-based resource manner.

Because the first time-frequency resource indicates all the available time-frequency resources in the communications domain in which the network control apparatus is located, a resource size of the first time-frequency resource is more sufficient than a resource size of the pre-configured limited time-frequency resource used for random access in the existing contention-based random access method. This can reduce a probability of a resource conflict occurred during access of the terminals and improve communication efficiency and resource utilization.

In a second possible implementation, the first terminal may determine, from the first time-frequency resource, a second time-frequency resource corresponding to the first terminal. The first terminal sends the access information of the first terminal to the network control apparatus on the second time-frequency resource.

It should be noted that the second time-frequency resource corresponding to the first terminal in this embodiment of this application may be understood as a time-frequency resource used by the first terminal to report the access information.

Optionally, when the at least one terminal is a plurality of terminals, the first time-frequency resource includes time-frequency resources used for each of the plurality of terminals to report access information.

It should be noted that the time-frequency resources used for each of the plurality of terminals to report the access information are orthogonal to each other. For example, in the first time-frequency resource, a second time-frequency resource used to report the access information of the first terminal and a third time-frequency resource used to report access information of a second terminal are orthogonal to each other. In other words, time-frequency resources used by any two of the plurality of terminals to report access information do not overlap with each other in time frequency or frequency domain.

For example, when the plurality of terminals include the first terminal and the second terminal, the first time-frequency resource may include the second time-frequency resource used by the first terminal to report the access information and the third time-frequency resource used by the second terminal to report the access information, and the second time-frequency resource and the third time-frequency resource do not overlap each other, or the second time-frequency resource and the third time-frequency resource do not overlap each other in time frequency or frequency domain.

According to the access method provided in this embodiment of this application, the time-frequency resources used for each of the plurality of terminals to report the access information are orthogonal to each other. This can reduce a probability of a resource conflict occurred during access of the terminals, and improve communication efficiency and resource utilization.

Optionally, the second time-frequency resource corresponding to the first terminal may be indicated by at least one of the following: second identity information of the first terminal, a resource size of the first time-frequency resource, a resource size of the second time-frequency resource corresponding to the first terminal, or at least one pre-configured value. This is not limited in this embodiment of this application.

It should be noted that the second identity information of the first terminal may be understood as information that can uniquely identify the identity of the terminal in the communications domain in which the first terminal is located.

Optionally, the second identity information may include at least one of the following: a device identifier, a MAC address, a soft address, or a short address.

Optionally, the first identity information and the second identity information of the first terminal may be the same or may be different. This is not limited in this embodiment of this application.

For example, the first identity information may include a MAC address, and the second identity information may include a soft address.

For another example, the first identity information may include a MAC address+a device identifier, and the second identity information may include a soft address.

Optionally, the resource size of the time-frequency resource (for example, the resource size of the first time-frequency resource or the resource size of the second time-frequency resource) in this embodiment of this application may represent any one of the following meanings: a quantity of resource elements (resource element, RE) included in the time-frequency resource, a quantity of channels included in the time-frequency resource, a quantity of time domain resource units and a quantity of frequency domain resource units included in the time-frequency resource, or a time domain length and a frequency domain bandwidth of the time-frequency resource. However, a person skilled in the art may learn that the foregoing meanings are merely used as examples for description, and do not limit a meaning of a resource size.

Optionally, the first terminal may determine, in a plurality of manners, the resource size of the second time-frequency resource corresponding to the first terminal. This is not limited in this embodiment of this application.

In a possible implementation, the first terminal may determine, based on the modulation and coding information and a size of the access information, the resource size of the second time-frequency resource corresponding to the first terminal.

In a second possible implementation, before S220, the first terminal may receive second configuration information from the network control apparatus, where the second configuration information is used to configure the resource size of the second time-frequency resource corresponding to the first terminal.

Optionally, the access configuration information and the second configuration information may be carried in a same message, or may be carried in different messages. This is not limited in this embodiment of this application.

In a third possible implementation, the first terminal and the network control apparatus may agree in advance on the resource size of the second time-frequency resource corresponding to the first terminal.

It should be noted that the at least one pre-configured value may be a pre-configured value used to determine a second time-frequency resource corresponding to each terminal.

In a possible implementation, the at least one value may include a first value, and the first value is used to indicate a quantity of terminals.

For example, the quantity of terminals may indicate a quantity of terminals in a group corresponding to a multicast address.

For another example, the quantity of terminals may be a quantity of terminals that make an incoming call by the network control apparatus based on the resource configuration information.

Optionally, the at least one value may be pre-configured for the terminal in a plurality of manners. This is not limited in this embodiment of this application.

In a first possible implementation, the at least one value may be pre-configured in a communications protocol, and the first terminal may obtain the at least one value based on the communications protocol.

In a second possible implementation, before S220, the first terminal may receive third configuration information from the network control apparatus, where the third configuration information is used to configure the at least one value.

Optionally, the access configuration information and the third configuration information may be carried in a same message, or may be carried in different messages. This is not limited in this embodiment of this application.

In a third possible implementation, the first terminal and the network control apparatus may agree on the at least one value in advance.

Optionally, the first terminal may determine, from the first time-frequency resource in a plurality of manners, the second time-frequency resource corresponding to the first terminal. This is not limited in this embodiment of this application.

In a first possible implementation, the first terminal may determine, based on the resource size of the first time-frequency resource and the resource size of the second time-frequency resource corresponding to the first terminal, the second time-frequency resource corresponding to the first terminal.

For example, the first terminal may determine, based on the resource size $N_1$ of the second time-frequency resource corresponding to the first terminal and the resource size N of the first time-frequency resource, a quantity of pieces of access information that can be reported on the first time-frequency resource: $Nu=\lfloor N/N_1 \rfloor$ ($\lfloor \ \rfloor$ represents rounding down). The first terminal randomly generates an integer M from [0, $N_u-1$] or [1, $N_u$], and determines a first resource block numbered M in the $N_u$ resource blocks included in the first time-frequency resource as the second time-frequency resource corresponding to the first terminal.

It should be noted that, because the network control apparatus and the first terminal may be produced by a same vehicle manufacturer, before the vehicle is delivered from a factory, related information (for example, the second identity information of the first terminal, the resource size of the second time-frequency resource corresponding to the first terminal, and the at least one value) used to determine the second time-frequency resource corresponding to the first terminal and a calculation rule of the second time-frequency resource may be pre-configured for the network control apparatus. Therefore, the network control apparatus does not need to perform additional signaling interaction with the first terminal to obtain the related information required for determining the second time-frequency resource corresponding to the first terminal. This can reduce signaling overheads, and reduce an access delay and improve communication efficiency.

It should be further noted that the network control apparatus and the first terminal may agree on a division rule and a number rule of the $N_u$ resource blocks in advance, and the network control apparatus and the first terminal may determine a number and a resource size of each of the $N_u$ resource blocks according to the number rule and the division rule.

In other words, the network control apparatus and the first terminal can determine, by using a similar method, the second time-frequency resource corresponding to the first terminal.

However, in the foregoing first possible implementation, because M is a random number selected by the first terminal, the network control apparatus cannot learn which random number is randomly selected by the first terminal. Therefore, the network control apparatus needs to receive, on the first time-frequency resource, the access information reported by the first terminal.

When the quantity of at least one terminal that reports access information to the network control apparatus is far less than $N_u$, the foregoing method for randomly selecting the resource block can ensure that different terminals select different resource blocks to send access information. This can reduce a probability of a resource conflict, reduce an access delay, and improve communication efficiency.

In a second possible implementation, the first terminal may determine, based on the resource size of the first time-frequency resource, the resource size of the second time-frequency resource corresponding to the first terminal, and the second identity information of the first terminal, the second time-frequency resource corresponding to the first terminal.

For example, the second identity information includes a media access control (media access control, MAC) address. The first terminal may determine, based on the resource size $N_1$ of the second time-frequency resource corresponding to the first terminal and the resource size N of the first time-frequency resource, a quantity of pieces of access information that can be reported on the first time-frequency resource: $Nu=\lfloor N/N_1 \rfloor$ ($\lfloor \ \rfloor$ represents rounding down). The first terminal may perform a modulo operation on the MAC address and $N_u$ to obtain an integer M, and determine a first resource block numbered M in the $N_u$ resource blocks included in the first time-frequency resource as the second time-frequency resource corresponding to the first terminal.

According to the foregoing method for selecting the resource block by using the MAC address, because the MAC address of the first terminal is pre-configured for the network control apparatus, the network control apparatus can directly use the pre-configured MAC address to select the resource block corresponding to the first terminal, and does not need to perform signaling interaction with the first terminal to obtain the MAC address. This can reduce an access delay and improve communication efficiency.

For another example, the second identity information includes a soft address. The first terminal may determine, based on the resource size $N_1$ of the second time-frequency resource corresponding to the first terminal and the resource size N of the first time-frequency resource, a quantity of pieces of access information that can be reported on the first time-frequency resource: $Nu=\lfloor N/N_1 \rfloor$ ($\lfloor \ \rfloor$ represents rounding down). The first terminal may perform a modulo operation on the soft address and $N_u$ to obtain an integer M, and determine a first resource block numbered M in the $N_u$ resource blocks included in the first time-frequency resource as the second time-frequency resource corresponding to the first terminal.

According to the foregoing method for selecting the resource block by using the soft address, the soft address of each terminal and the resource size of the first time-frequency resource are flexibly configured. This can effectively stagger time-frequency resources used by different terminals to report access information, that is, ensure that time-frequency resources used by different terminals to report access information do not overlap each other, reduce a probability of a resource conflict occurred during access of the terminals, and improve communication efficiency and resource utilization.

In a third possible implementation, the first terminal may determine, based on the second identity information of the first terminal and the first value, the second time-frequency resource corresponding to the first terminal, where the at least one value includes the first value.

For example, the second identity information includes a MAC address. The first terminal may perform a modulo operation on the MAC address and the first value to obtain an integer M, and determine a first resource block numbered M in resource blocks, with a quantity of first value, included in the first time-frequency resource as the second time-frequency resource corresponding to the first terminal.

Correspondingly, in the foregoing second or third possible implementation, the network control apparatus may determine M based on the pre-configured related information used to determine the second time-frequency resource corresponding to the first terminal. Therefore, that the network control apparatus receives the access information of the first terminal on the first time-frequency resource may include: The network control apparatus receives the access information of the first terminal on the second time-frequency resource corresponding to the first terminal.

According to the foregoing resource block selection method, because second identity information of each terminal is pre-configured for the network control apparatus, the first value can be appropriately set to effectively stagger time-frequency resources used by different terminals to report access information, that is, to ensure that time-frequency resources used by different terminals to report access information do not overlap each other. This can reduce a probability of a resource conflict occurred during access of the terminals, and improve communication efficiency and resource utilization.

Optionally, when the quantity of the at least one terminal is greater than 1, at least two terminals in the plurality of terminals may have different attributes, and the network control apparatus may configure, by using the resource configuration information, different sub-resources for terminals with different attributes, where the first time-frequency resource includes the sub-resources corresponding to the terminals with different attributes.

Optionally, the attribute may include at least one of a device type, a multicast address, or a device priority.

Specifically, the device type may include a microphone type, an acoustic device type, a display type, and the like. The device type is not specifically limited in this application.

It should be noted that, that multicast addresses of terminals are different may be understood as that the terminals belong to different terminal groups.

Optionally, the device priority of the terminal may be divided in a plurality of manners. This is not limited in this embodiment of this application.

In a possible implementation, the device priority may be divided based on a location area of the terminal in the cabin.

For example, a device priority of a terminal located in a front-row seating area is higher than a device priority of a terminal located in a back-row seating area.

In another possible implementation, the device priority of the terminal may be divided based on the device type of the terminal.

For example, a device priority of a display is higher than a device priority of an acoustic device, and the device priority of the acoustic device is higher than a device priority of a microphone.

Optionally, the network control apparatus may configure the different time-frequency sub-resources for the terminals with different attributes in the following several manners.

For example, the attribute includes a device type, and the plurality of terminals include a microphone 1, a microphone 2, and a display 1. In this case, the microphone 1 and the microphone 2 correspond to a time-frequency sub-resource 1, and the display 1 corresponds to a time-frequency sub-resource 2. The first time-frequency resource includes the time-frequency sub-resource 1 and the time-frequency sub-resource 2.

For another example, the attribute includes a device type and a device priority, and the plurality of terminals may include an acoustic device 1, an acoustic device 2, an acoustic device 3, a display 1, and a display 2 that are located in a front-row seating area, and an acoustic device 4 and an acoustic device 5 that are located in a back-row seating area. In this case, the acoustic device 1, the acoustic device 2, and the acoustic device 3 correspond to a time-frequency sub-resource 1, the display 1 and the display 2 correspond to a time-frequency sub-resource 2, and the acoustic device 4 and the acoustic device 5 correspond to a time-frequency sub-resource 3. The first time-frequency resource includes the time-frequency sub-resource 1, the time-frequency sub-resource 2, and the time-frequency sub-resource 3.

For another example, the attribute includes a device type, a multicast address, and a device priority. The plurality of terminals may include an acoustic device 1, an acoustic device 2, an acoustic device 3, an acoustic device 4, and a display 1 that are located in a front-row seating area, and an acoustic device 5 and a display 2 that are located in a back-row seating area. For example, the acoustic device 1, the acoustic device 2, and the display 1 belong to a first terminal group, and the acoustic device 3, the acoustic device 4, the acoustic device 5, and the display 2 belong to a second terminal group. In this case, the acoustic device 1, the acoustic device 2, and the display 1 correspond to a time-frequency sub-resource 1, the acoustic device 4 corresponds to a time-frequency sub-resource 2, and the acoustic device 5 and the display 2 correspond to a time-frequency sub-resource 3. The first time-frequency resource includes the time-frequency sub-resource 1, the time-frequency sub-resource 2, and the time-frequency sub-resource 3.

In other words, the first time-frequency resource may include at least two time-frequency sub-resources, the at least two time-frequency sub-resources are in a one-to-one correspondence with at least two attributes, and each time-frequency sub-resource is used for access of at least one terminal with an attribute corresponding to the time-frequency sub-resource.

In other words, terminals with different attributes perform access on time-frequency sub-resources corresponding to attributes to which the terminals belong. At least one terminal with a same attribute performs access on a time-frequency sub-resource corresponding to the attribute, and the time-frequency sub-resource used for access of the at least one terminal with the same attribute includes a time-frequency resource used by each of the at least one terminal to report access information.

In a possible implementation, for example, the plurality of terminals include a first terminal with a first attribute and a second terminal with a second attribute, the first terminal corresponds to a first time-frequency sub-resource in the first time-frequency resource, and the second terminal corresponds to a second time-frequency sub-resource in the first time-frequency resource. S220 may be as follows: The first terminal sends the access information of the first terminal to the network control apparatus on the first time-frequency sub-resource. Correspondingly, the network control apparatus receives the access information of the first terminal on the first time-frequency sub-resource. Similarly, the second terminal sends the access information of the second terminal to the network control apparatus on the second time-frequency sub-resource. Correspondingly, the network control apparatus receives the access information from the second terminal on the second time-frequency sub-resource.

In another possible implementation, for example, the plurality of terminals include a first terminal and a second terminal with a first attribute, and the first attribute corresponds to a first time-frequency sub-resource in the first time-frequency resource. S220 may be as follows: The first terminal sends, on a second time-frequency resource in the first time-frequency sub-resource, the access information of the first terminal to the network control apparatus. Correspondingly, the network control apparatus receives the access information of the first terminal on the second time-frequency resource. Similarly, the second terminal sends, on a third time-frequency resource in the first time-frequency sub-resource, the access information of the second terminal to the network control apparatus. Correspondingly, the network control apparatus receives the access information from the second terminal on the third time-frequency resource.

It should be noted that at least one of a time domain resource or a frequency domain resource in time-frequency sub-resources corresponding to terminals with different attributes is different.

In other words, at least one of a time domain resource or a frequency domain resource in the first time-frequency sub-resource and that in the second time-frequency sub-resource do not overlap.

According to the access method provided in this embodiment of this application, the network control apparatus configures the different time-frequency sub-resources for the terminals with different attributes, so that the terminals with the different attributes perform access on the time-frequency sub-resources corresponding to the attributes to which the terminals belong. This can reduce a probability of a resource conflict occurred during access of the terminals with different attributes, and improve communication efficiency and resource utilization.

It should be noted that for a method in which the first terminal determines, on the first time-frequency sub-resource, the second time-frequency resource corresponding to the first terminal, refer to the foregoing method for determining, on the first time-frequency resource, the second time-frequency resource corresponding to the first terminal. A difference lies only in that: The resource size of the first time-frequency resource is replaced with a resource size of the first time-frequency sub-resource. To avoid repetition, details are not described herein again.

It should be noted that S220 is described above by using only the first terminal in the at least one terminal as an example. When the quantity of the at least one terminal is greater than 1, a process in which another terminal in the plurality of terminals implements S220 is similar to that of the first terminal. To avoid repetition, details are not described herein again.

Optionally, the method may further include: The network control apparatus determines that at least one first target terminal in the at least one terminal successfully performs access.

Optionally, the network control apparatus may determine, in a plurality of manners, that the at least one first target terminal successfully performs access. This is not limited in this embodiment of this application.

In a first possible implementation, the network control apparatus may determine, based on access information of each of the at least one terminal, that the at least one first target terminal successfully performs access.

In other words, the network control apparatus successfully obtains the access information of each of the at least one terminal through parsing.

For example, the at least one terminal includes a terminal 1 and a terminal 2. If the network control apparatus successfully obtains a MAC address 1—abnormal state and a MAC address 2—normal state through parsing, it may be determined that the terminal 2 corresponding to the MAC address 2 successfully performs access.

For another example, the at least one terminal includes a terminal 1 and a terminal 2. If the network control apparatus successfully obtains a MAC address 1—normal state and a MAC address 2—normal state through parsing, it may be determined that the terminal corresponding to the MAC address 1 and the terminal 2 corresponding to the MAC address 2 successfully perform access.

For another example, the at least one terminal includes a terminal 1 and a terminal 2. If the network control apparatus successfully obtains a MAC address 1 and a MAC address 2 through parsing, it may be determined that the terminal corresponding to the MAC address 1 and the terminal 2 corresponding to the MAC address 2 successfully perform access.

For another example, the at least one terminal includes a terminal 1 and a terminal 2. If access information received by the network control apparatus on a resource block 1 indicates a "normal state", and access information received on a resource block 2 indicates a "normal state", it may be determined that the terminal 1 corresponding to the resource block 1 and the terminal 2 corresponding to the resource block 2 successfully perform access.

In a second possible implementation, the network control apparatus may determine, based on access information of each of the at least one first target terminal, that the at least one first target terminal successfully performs access.

For example, if a terminal 1 and a terminal 2 select a same resource block and send respective access information, the network control apparatus may successfully decode access information from only one terminal, or fail to decode the access information, or obtain no access information. In this way, only a terminal corresponding to the access information successfully decoded by the network control apparatus successfully performs access.

Optionally, the method further includes: The network control apparatus sends indication information to the at least one first target terminal, where the indication information is used to indicate that the at least one first target terminal successfully performs access. Correspondingly, each of the at least one first target terminal receives the indication information from the network control apparatus, and determines, based on the indication information, that access succeeds.

Optionally, the network control apparatus may send the indication information to the at least one first target terminal in a plurality of manners. This is not limited in this embodiment of this application.

In a possible implementation, the network control apparatus may send the indication information to each of the at least one first target terminal.

In another possible implementation, the network control apparatus may send a system broadcast message, where the system broadcast message includes the indication information.

Optionally, the indication information may indicate, in a plurality of manners, that the at least one first target terminal successfully performs access. This is not limited in this embodiment of this application.

In a first possible implementation, the indication information may include third identity information of each of the at least one first target terminal, and the third identity information of each first target terminal is used to indicate the first target terminal.

It should be noted that the third identity information may include at least one of the following: a device identifier, a MAC address, a soft address, or a short address of the first target terminal.

Optionally, the third identity information of the first target terminal may be the same as or different from the first identity information reported when access is requested. This is not limited in this embodiment of this application.

For example, the at least one terminal includes a terminal 1, a terminal 2, a terminal 3, and a terminal 4. When the indication information includes MAC 1, MAC 2, and MAC 3, it indicates that the terminal 1 corresponding to the MAC 1, the terminal 2 corresponding to the MAC 2, and the terminal 3 corresponding to the MAC 3 successfully perform access.

In a second possible implementation, the indication information may include third identity information of each of at least one second target terminal, the third identity information of each second target terminal is used to indicate the second target terminal, and the at least one second target terminal is a terminal that fails to perform access in the at least one terminal.

For example, the at least one terminal includes a terminal 1, a terminal 2, a terminal 3, and a terminal 4. When the indication information includes MAC 2 and MAC 4, it indicates that the terminal 2 corresponding to the MAC 2 and the terminal 4 corresponding to the MAC 4 fail to perform access, and the terminal 1 corresponding to MAC 1 and the terminal 3 corresponding to MAC 3 successfully perform access.

Optionally, the method further includes: The network control apparatus sends scheduling information to the at least one first target terminal, where the scheduling information is used to indicate a fourth time-frequency resource used for each of the at least one first target terminal. Correspondingly, each first target terminal receives the scheduling information from the network control apparatus, and transmits data with the network control apparatus on the fourth time-frequency resource of the first target terminal.

Optionally, the network control apparatus may send the scheduling information to the at least one first target terminal in a plurality of manners. This is not limited in this embodiment of this application.

In a first possible implementation, the network control apparatus may send scheduling information of each first target terminal to each first target terminal, where the scheduling information of each first target terminal is used to indicate the fourth time-frequency resource of each first target terminal.

In a second possible implementation, the network control apparatus may send a system broadcast message, where the system broadcast message includes the scheduling information, and the scheduling information is used to indicate the fourth time-frequency resource for each first target terminal.

For example, the scheduling information includes a correspondence between an identifier of each first target terminal and a fourth time-frequency resource of each first target terminal.

In a third possible implementation, when the at least one target terminal includes a plurality of target terminals, the network control apparatus may schedule the plurality of target terminals by group.

It should be noted that, to reduce signaling overheads, the network control apparatus may directly send the scheduling information to the at least one target terminal without sending the indication information to the at least one target terminal.

In other words, provided that the scheduling information is received, the first target terminal can determine that the first target terminal successfully performs access.

Optionally, at least one second target terminal that fails to perform access in the at least one terminal on the second time-frequency resource may initiate access to the network control apparatus again.

In a possible implementation, each of the at least one second target terminal may send access information of each second target terminal to the network control apparatus on a fifth time-frequency resource. Correspondingly, the network control apparatus receives the access information from the at least one second target terminal on the fifth time-frequency resource.

Specifically, each second target terminal may send the access information of each second target terminal to the network control apparatus on a sixth time-frequency resource corresponding to each second target terminal, where the fifth time-frequency resource includes the sixth time-frequency resource corresponding to each of the plurality of second target terminals. Correspondingly, the network control apparatus receives the access information from each second target terminal on the sixth time-frequency resource corresponding to each second target terminal.

It should be noted that, for a process in which a second target terminal sends access information of the second target terminal to the network control apparatus on the sixth time-frequency resource corresponding to the second target terminal, refer to the process in which the first terminal sends the access information of the first terminal to the network control apparatus on the second time-frequency resource corresponding to the first terminal. To avoid repetition, details are not described herein again.

Optionally, the first time-frequency resource includes the fifth time-frequency resource, or the fifth time-frequency resource is different from the first time-frequency resource.

In a first possible implementation, the first time-frequency resource may include a second time-frequency resource corresponding to each terminal and the fifth time-frequency resource.

It should be noted that a start moment of the fifth time-frequency resource in time domain is not earlier than an end moment of the second time-frequency resource corresponding to each terminal in time domain.

In a second possible implementation, when at least two terminals in the plurality of terminals have different attributes, the first time-frequency resource may include a time-frequency sub-resource corresponding to a terminal with a different attribute and the fifth time-frequency resource.

It should be noted that a start moment of the fifth time-frequency resource in time domain is not earlier than an end moment of the time-frequency sub-resource corresponding to the terminal with the different attribute in time domain.

In conclusion, the first time-frequency resource may include two phases in time domain. A first phase is used by a plurality of terminals to perform group access or batch access, and a second phase is used by a terminal that fails to perform access in the first phase to perform access again.

In a third possible implementation, the fifth time-frequency resource is a time-frequency resource other than the first time-frequency resource.

It should be noted that a start moment of the fifth time-frequency resource in time domain is not earlier than an end moment of the first time-frequency resource in time domain.

In conclusion, the first time-frequency resource is used by the plurality of terminals to perform group access or batch access, and the fifth time-frequency resource is used by the terminal that fails to perform access on the first time-frequency resource to perform access again.

Optionally, the second target terminal may determine the fifth time-frequency resource in a plurality of manners. This is not limited in this embodiment of this application.

In a possible implementation, the resource configuration information is further used to configure the fifth time-frequency resource to be used by the at least one second target terminal to perform access again.

In another possible implementation, the network control apparatus may send fourth access configuration information to the at least one second target terminal, where the fourth access configuration information is used to indicate the fifth time-frequency resource.

According to the access method provided in this embodiment of this application, because the vehicle is just powered on, there is no terminal access in the communications domain in which the network control apparatus is located, that is, there is no another terminal or service that needs to be served in the system. Therefore, the network control apparatus can calculate all the available time-frequency resources that are in the current communications domain and used for initial access, and use all the time-frequency resources for group access or batch access of the vehicular terminal. After initial access is completed, the vehicle enters the running state, and subsequent access requests comply with random distribution, that is, random access is initiated after a service of a terminal (including the vehicular terminal and/or the non-vehicular terminal that do/does not perform initial access) randomly arrives. Therefore, after the vehicle enters the running state, the terminal that subsequently requests access may perform random access in the foregoing Scenario 1 on the pre-configured time-frequency resource used for random access. This can improve resource utilization and communication efficiency while meeting access requirements of terminals in different access scenarios.

The access method 200 provided in embodiments of this application is described above with reference to FIG. 3. An access apparatus and an access control apparatus that are configured to perform the method 200 are described below with reference to FIG. 4 to FIG. 6.

It should be noted that the access apparatus may be the terminal in the embodiment of the method 200, and can perform the method implemented by the terminal in the method 200. The access control apparatus may be the network control apparatus in the embodiment of the method 200, and can perform the method implemented by the network control apparatus in the method 200.

It may be understood that, to implement the foregoing functions, the access apparatus or the access control apparatus includes corresponding hardware and/or software modules for performing the functions. With reference to algorithm steps of each example described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments, the access apparatus and the access control apparatus may be divided into function modules based on the examples in the foregoing method. For example, each function module corresponding to each function may be obtained through division, or two or more functions may be integrated into one processing module. The integrated module may be implemented in a form of hardware. It should be noted that, in embodiments, division into the modules is an example and is merely logical function division, and may be other division in an actual implementation.

Figure 4:
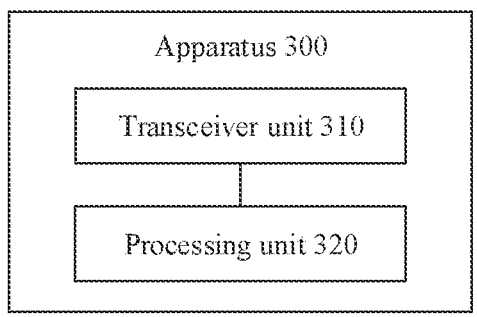
FIG. 4 is a schematic block diagram of an apparatus 300 according to an embodiment of this application.

When each function module is obtained through division based on each corresponding function, FIG. 4 is a schematic diagram of a possible composition of the access apparatus (for example, a terminal) or the access control apparatus (for example, a network control apparatus) in the foregoing embodiments. As shown in FIG. 4, the apparatus 300 may include a transceiver unit 310 and a processing unit 320.

The processing unit 320 may control the transceiver unit 310 to implement the method performed by the network control apparatus or the terminal in the embodiment of the method 200, and/or another process of the technology described in this specification.

It should be noted that the transceiver unit in this embodiment of this application may alternatively be a communications interface.

It should be noted that all related content of the steps in the foregoing method embodiments may be cited in function descriptions of corresponding function modules. Details are not described herein again.

The apparatus 300 provided in this embodiment is configured to perform the method 200. Therefore effects that are the same as those of the foregoing implementation method can be achieved.

When an integrated unit is used, the apparatus 300 may include a processing unit, a storage unit, and a communications unit. The processing unit may be configured to control and manage an action of the apparatus 300, for example, may be configured to support the apparatus 300 in performing steps performed by the foregoing units. The storage unit may be configured to support the apparatus 300 in storing program code, data, and the like. The communications unit may be configured to support communication between the apparatus 300 and another device.

The processing unit may be a processor or a controller. The processor may implement or execute various example logical blocks, modules, and circuits described with reference to content disclosed in this application. The processor may alternatively be a combination, for example, a combination including one or more microprocessors or a combination of digital signal processor (digital signal processor, DSP) and a microprocessor, for implementing a computing function. The storage unit may be a memory. The communications unit may be specifically a device that communicates with another electronic device, for example, a radio frequency circuit, a Bluetooth chip, and a Wi-Fi chip.

Figure 5:
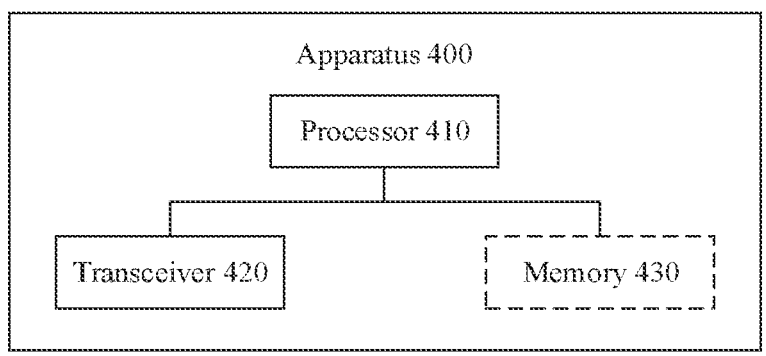
FIG. 5 is a schematic block diagram of an apparatus 400 according to an embodiment of this application.

In a possible implementation, the access apparatus or the access control apparatus in this embodiment may be an apparatus 400 in a structure shown in FIG. 5. The FIG. 5 may be a schematic diagram of a structure of a terminal, or may be a schematic diagram of a structure of a network control apparatus. The apparatus 400 includes a processor 410 and a transceiver 420, and the processor 410 and the transceiver 420 communicate with each other through an internal connection path. A related function implemented by the processing unit 320 in FIG. 4 may be implemented by the processor 410. A related function implemented by the transceiver unit 310 may be implemented by the processor 410 by controlling the transceiver 420.

Optionally, the apparatus 400 may further include a memory 430. The processor 410, the transceiver 420, and the memory 430 communicate with each another through an internal connection path. A related function implemented by the storage unit in FIG. 4 may be implemented by the memory 430.

In a possible implementation, when the apparatus 300 or the apparatus 400 is deployed (or integrated) in a terminal, the apparatus 300 or the apparatus 400 in embodiments of this application may be the terminal.

Figure 6:
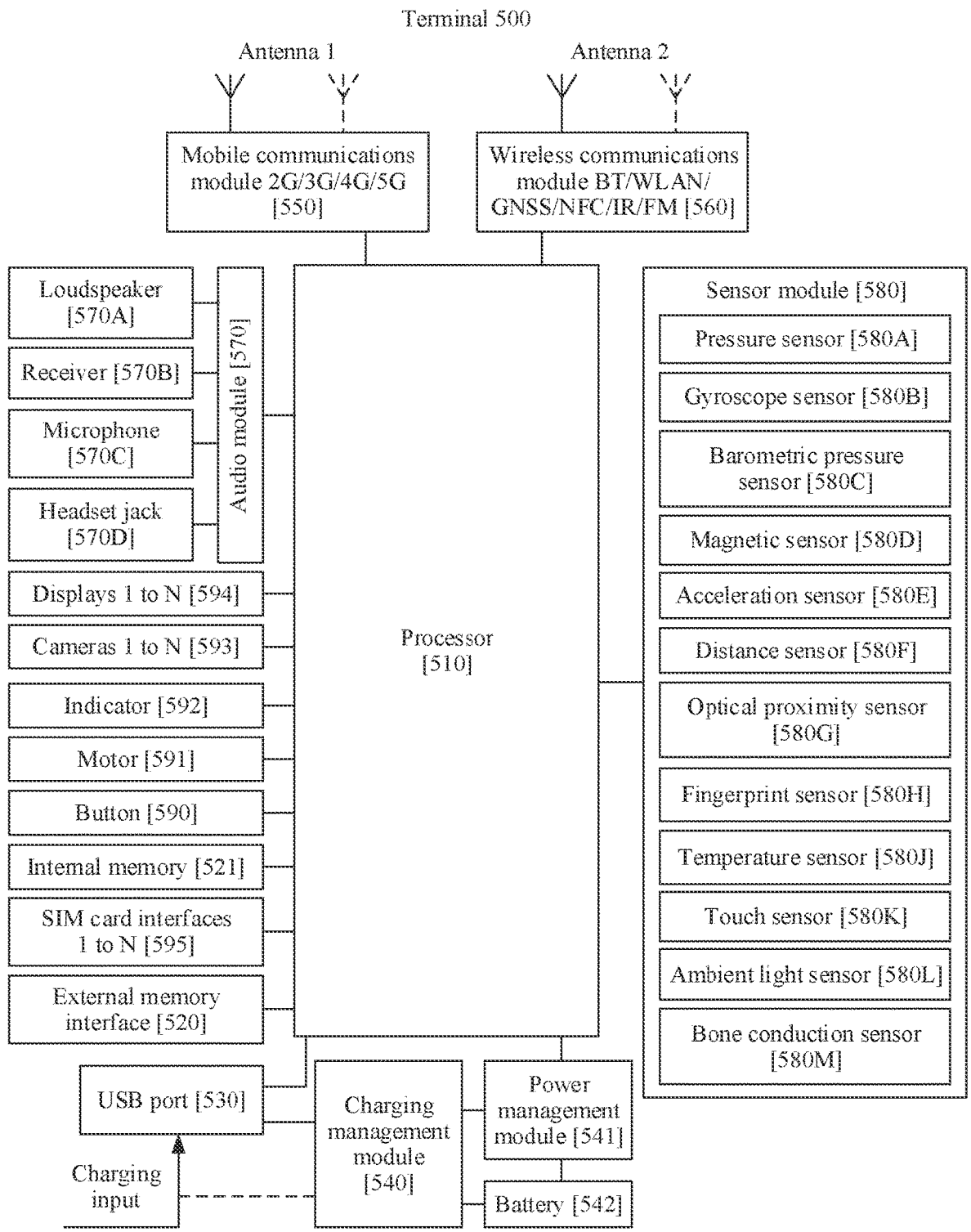
FIG. 6 is a schematic block diagram of a terminal 500 according to an embodiment of this application.

FIG. 6 is a schematic diagram of a structure of a terminal 500. The terminal 500 may be shown in FIG. 6. The terminal 500 may include a processor 510, an external memory interface 520, an internal memory 521, a universal serial bus (universal serial bus, USB) port 530, a charging management module 540, a power management module 541, a battery 542, an antenna 1, an antenna 2, a mobile communications module 550, a wireless communications module 560, an audio module 570, a speaker 570A, a receiver 570B, a microphone 570C, a headset jack 570D, a sensor module 580, a button 590, a motor 591, an indicator 592, a camera 593, a display 594, a subscriber identity module (subscriber identity module, SIM) card interface 595, and the like.

It may be understood that the structure shown in this embodiment of this application does not constitute a specific limitation on the terminal 500. In some other embodiments of this application, the terminal 500 may include more or fewer components than those shown in the figure, or some components may be combined, or some components may be split, or there may be a different component layout. The components shown in the figure may be implemented in hardware, software, or a combination of software and hardware.

The processor 510 may include one or more processing units. For example, the processor 510 may include an application processor (application processor, AP), a modem processor, a graphics processing unit (graphics processing unit, GPU), an image signal processor (image signal processor, ISP), a controller, a video codec, a digital signal processor (digital signal processor, DSP), an application-specific integrated circuit (application-specific integrated circuit, ASIC), a field-programmable gate array (field-programmable gate array, FPGA), a baseband processor, a neural-network processing unit (neural-network processing unit, NPU), and/or the like. Different processing units may be independent components, or may be integrated into one or more processors. In some embodiments, the terminal 500 may alternatively include one or more processors 510. The controller may generate an operation control signal based on instruction operation code and a time sequence signal, to complete control of instruction reading and instruction execution. In some other embodiments, a memory may be disposed in the processor 510, to store instructions and data. For example, the memory in the processor 510 may be a cache. The memory may store instructions or data just used or cyclically used by the processor 510. If the processor 510 needs to use the instructions or the data again, the processor may directly invoke the instructions or the data from the memory. In this way, repeated access is avoided, waiting time of the processor 510 is reduced, and efficiency of processing data or executing instructions by the terminal 500 is improved.

In some embodiments, the processor 510 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface, a USB port, and/or the like. The USB port 530 is a port that conforms to a USB standard specification, and may be specifically a mini USB port, a micro USB port, a USB Type-C port, or the like. The USB port 530 may be used to connect to a charger to charge the terminal 500, or may be configured to transmit data between the terminal 500 and a peripheral device. The USB port 530 may alternatively be used to connect to a headset, and play audio by using the headset.

It may be understood that an interface connection relationship between the modules in this embodiment of this application is merely an example for description, and does not constitute a limitation on the structure of the terminal 500. In some other embodiments of this application, the terminal 500 may alternatively use an interface connection manner different from that in the foregoing embodiment, or may use a combination of a plurality of interface connection manners.

The charging management module 540 is configured to receive a charging input from a charger. The charger may be a wireless charger or a wired charger. In some embodiments of wired charging, the charging management module 540 may receive a charging input of a wired charger through the USB port 530. In some embodiments of wireless charging, the charging management module 540 may receive a wireless charging input through a wireless charging coil of the terminal 500. The charging management module 540 may further supply power to the terminal by using the power management module 541 while charging the battery 542.

The power management module 541 is configured to connect to the battery 542, the charging management module 540, and the processor 510. The power management module 541 receives an input of the battery 542 and/or the charging management module 540, and supplies power to the processor 510, the internal memory 521, an external memory, the display 594, the camera 593, the wireless communications module 560, and the like. The power management module 541 may be configured to monitor parameters such as a battery capacity, a battery cycle count, and a battery health status (electric leakage or impedance). In some other embodiments, the power management module 541 may alternatively be disposed in the processor 510. In some other embodiments, the power management module 541 and the charging management module 540 may alternatively be disposed in a same device.

A wireless communications function of the terminal 500 may be implemented through the antenna 1, the antenna 2, the mobile communications module 550, the wireless communications module 560, the modem processor, the baseband processor, and the like.

The antenna 1 and the antenna 2 are configured to transmit and receive electromagnetic wave signals. Each antenna in the terminal 500 may be configured to cover one or more communications frequency bands. Different antennas may be multiplexed, to improve antenna utilization. For example, the antenna 1 may be multiplexed as a diversity antenna of a wireless local area network. In some other embodiments, an antenna may be used in combination with a tuning switch.

The mobile communications module 550 may provide a solution that is applied to the terminal 500 and that includes wireless communications such as 2G, 3G, 4G, 5G, and the like. The mobile communications module 550 may include at least one filter, a switch, a power amplifier, a low noise amplifier (low noise amplifier, LNA), and the like. The mobile communications module 550 may receive an electromagnetic wave through the antenna 1, perform processing such as filtering or amplification on the received electromagnetic wave, and transmit a processed electromagnetic wave to the modem processor for demodulation. The mobile communications module 550 may further amplify a signal modulated by the modem processor, and convert an amplified signal into an electromagnetic wave through the antenna 1 for radiation. In some embodiments, at least some function modules in the mobile communications module 550 may be disposed in the processor 510. In some embodiments, at least some function modules in the mobile communications module 550 and at least some modules in the processor 510 may be disposed in a same device.

The wireless communications module 560 may provide a solution for wireless communications that is applied to the terminal 500 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, another possible general-purpose transmission technology, or the like.

Optionally, the wireless communications module 560 may be one or more components integrating at least one communication processing module. One communication processing module may correspond to one network interface. The network interface may be disposed in different service function modes. Network interfaces disposed in different modes may establish network connections corresponding to the modes.

For example, a network connection supporting a P2P function may be established by using a network interface in a P2P function mode. A network connection supporting a STA function may be established by using a network interface in a STA function mode. A network connection supporting an AP function may be established by using a network interface in an AP mode.

The wireless communications module 560 receives an electromagnetic wave through the antenna 2, performs frequency modulation and filtering processing on an electromagnetic wave signal, and sends a processed signal to the processor 510. The wireless communications module 560 may further receive a to-be-sent signal from the processor 510, perform frequency modulation and amplification on the signal, and convert a processed signal into an electromagnetic wave for radiation through the antenna 2.

The terminal 500 implements a display function by using the GPU, the display 594, the application processor, and the like. The GPU is a microprocessor for image processing, and is connected to the display 594 and the application processor. The GPU is configured to perform mathematical and geometric computation, and render an image. The processor 510 may include one or more GPUs that execute program instructions to generate or change display information.

The display 594 is configured to display an image, a video, or the like. The display 594 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light emitting diode, QLED), and the like. In some embodiments, the terminal 500 may include one or more displays 594.

In some embodiments of this application, when the display panel is made of a material such as an OLED, an AMOLED, or an FLED, the display 594 in FIG. 6 may be folded. Herein, that the display 594 may be folded means that the display may be folded to any angle at any part and may be maintained at the angle. For example, the display 594 may be folded left and right in the middle, or may be folded up and down in the middle. In this application, the display that can be folded is referred to as a foldable display. The touch display may be a screen, or may be a display formed by combining a plurality of screens. This is not limited herein.

The display 594 of the terminal 500 may be a flexible display. Currently, the flexible display attracts much attention because of unique features and huge potential of the flexible display. Compared with a conventional display, the flexible display has features of strong flexibility and bendability, and can provide a user with a new bendability-based interaction mode, to satisfy more requirements of the user on a terminal. For a terminal equipped with a foldable display, the foldable display of the terminal may be switched between a small display in a folded form and a large display in an unfolded form at any time. Therefore, the user uses a multi-screen display function more frequently on the terminal equipped with the foldable display.

The terminal 500 may implement a photographing function through the ISP, the camera 593, the video codec, the GPU, the display 594, the application processor, and the like.

The ISP is configured to process data fed back by the camera 593. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 593.

The camera 593 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the terminal 500 may include one or more cameras 593.

The digital signal processor is configured to process a digital signal, and may process another digital signal in addition to the digital image signal. For example, when the terminal 500 selects a frequency, the digital signal processor is configured to perform Fourier transform and the like on frequency energy.

The video codec is configured to compress or decompress a digital video. The terminal 500 may support one or more video codecs. In this way, the terminal 500 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. The NPU quickly processes input information based on a structure of a biological neural network, for example, a transfer service function between human brain neurons, and may further continuously perform self-learning. The NPU can implement applications such as intelligent cognition of the terminal 500, for example, image recognition, facial recognition, speech recognition, and text understanding.

The external memory interface 520 may be used to connect to an external storage card, for example, a micro SD card, to extend a storage capability of the terminal 500. The external storage card communicates with the processor 510 through the external memory interface 520, to implement a data storage function. For example, files such as music and videos are stored in the external storage card.

The internal memory 521 may be configured to store one or more computer programs. The one or more computer programs include instructions. The processor 510 may run the instructions stored in the internal memory 521, so that the terminal 500 performs a screen-off display method provided in some embodiments of this application, various applications, data processing, and the like. The internal memory 521 may include a program storage area and a data storage area. The program storage area may store an operating system. The program storage area may further store one or more applications (such as gallery and contacts), and the like. The data storage area may store data (for example, photos and contacts) created during use of the terminal 500, and the like. In addition, the internal memory 521 may include a high-speed random access memory, or may include a non-volatile memory, for example, one or more magnetic disk storage devices, a flash memory device, or a universal flash storage (universal flash storage, UFS). In some embodiments, the processor 510 may run the instructions stored in the internal memory 521 and/or the instructions stored in the memory that is disposed in the processor 510, so that the terminal 500 performs the screen-off display method provided in embodiments of this application, other applications, and data processing. The terminal 500 can implement an audio function such as music playing or recording by using the audio module 570, the speaker 570A, the receiver 570B, the microphone 570C, the headset jack 570D, the application processor, and the like.

The sensor module 580 may include a pressure sensor 580A, a gyroscope sensor 580B, a barometric pressure sensor 580C, a magnetic sensor 580D, an acceleration sensor 580E, a distance sensor 580F, an optical proximity sensor 580G, a fingerprint sensor 580H, a temperature sensor 580J, a touch sensor 580K, an ambient light sensor 580L, a bone conduction sensor 580M, and the like.

An embodiment further provides a computer storage medium. The computer storage medium stores computer instructions. When the computer instructions are run on an electronic device, the electronic device is enabled to perform the related method steps, to implement the access method in the foregoing embodiments.

An embodiment further provides a computer program product. When the computer program product runs on a computer, the computer is enabled to perform the related steps, to implement the access method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions, and when the apparatus runs, the processor may execute the computer-executable instructions stored in the memory, so that the chip performs the access method in the foregoing method embodiments.

Figure 7:
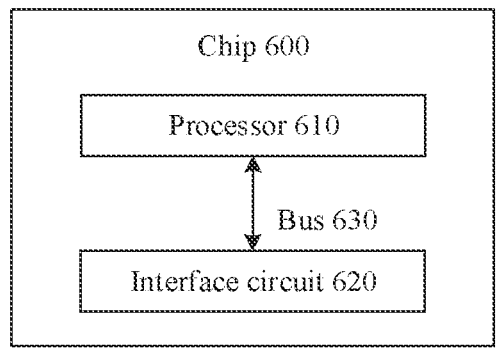
FIG. 7 is a schematic block diagram of a chip 600 according to an embodiment of this application.

FIG. 7 is a schematic diagram of a structure of a chip 600. The chip 600 includes one or more processors 610 and an interface circuit 620. Optionally, the chip 600 may further include a bus 630. The processor 610 may be an integrated circuit chip and has a signal processing capability.

In an implementation process, the steps in the foregoing method may be completed by using an integrated logic circuit of hardware in the processor 610 or instructions in a form of software. The foregoing processor 610 may be a general-purpose processor, a DSP, an ASIC, an FPGA or another programmable logic device, a discrete gate or transistor logic device, or a discrete hardware component. The processor may implement or perform the methods and steps that are disclosed in embodiments of this application. The general-purpose processor may be a microprocessor, or the processor may be any conventional processor, or the like.

The interface circuit 620 may be used to send or receive data, instructions, or information. The processor 610 may process data, instructions, or other information received through the interface circuit 620, and send, through the interface circuit 620, information obtained after processing.

Optionally, the chip further includes a memory. The memory may include a read-only memory and a random access memory, and provide operation instructions and data for the processor. A part of the memory may further include a non-volatile random access memory (non-volatile random access memory, NVRAM).

Optionally, the memory stores an executable software module or a data structure, and the processor may perform a corresponding operation by invoking operation instructions (the operation instructions may be stored in an operating system) stored in the memory.

Optionally, the chip may be used in the access apparatus or the access control apparatus in embodiments of this application. Optionally, the interface circuit 620 may be used to output an execution result of the processor 610. For the access method provided in one or more embodiments of this application, refer to the foregoing embodiments. Details are not described herein again.

It should be noted that functions corresponding to each of the processor 610 and the interface circuit 620 may be implemented by using a hardware design, may be implemented by using a software design, or may be implemented by combining software and hardware. This is not limited herein.

The network control apparatus, the terminal, the computer storage medium, the computer program product, or the chip provided in embodiments is configured to perform the corresponding method provided above. Therefore, for beneficial effects that can be achieved, refer to the beneficial effects in the corresponding method provided above. Details are not described herein again.

It should be understood that, in embodiments of this application, sequence numbers of the foregoing processes do not mean execution sequences. The execution sequences of the processes should be determined based on functions and internal logic of the processes, and should not constitute any limitation to implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other forms.

The units described as separate parts may or may not be physically separate, and parts displayed as units may or may not be physical units, that is, they may be located in one position, or may be distributed on a plurality of network units. Some or all of the units may be selected according to actual requirements to achieve the objective of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An access method, wherein the method is applied to a network control apparatus, and the method comprises:
   sending access configuration information, wherein the access configuration information configures an access manner of at least one second apparatus, and the access manner comprises a first access manner or a second access manner;
   receiving access information from a second apparatus, wherein the access information requests access, and the at least one second apparatus comprises the second apparatus, and wherein the access information comprises a first address that belongs to a pre-configured address set; and
   in response to receiving the access information, sending address information to the second apparatus, wherein the address information indicates to update the first address to a second address that does not belong to the pre-configured address set.

2. The method according to claim 1, wherein the access manner is the first access manner, and the first access manner indicates that access of terminals of a first terminal type and a second terminal type is allowed.

3. The method according to claim 2, wherein the first access manner comprises contention-based access.

4. The method according to claim 2, wherein the second apparatus belongs to the first terminal type or the second terminal type.

5. The method according to claim 2, wherein the receiving access information from a second apparatus comprises:
receiving the access information of the second apparatus on a pre-configured first time-frequency resource.

6. The method according to claim 1, wherein the address set is predefined in a communications protocol, or the address set is configured by first configuration information from the network control apparatus to the second apparatus, or the address set is agreed between the network control apparatus and the second apparatus before sending the access configuration information.

7. An access method, wherein the method comprises:
receiving, by a second apparatus, access configuration information from a network control apparatus, wherein the access configuration information configures an access manner of at least one second apparatus, the access manner comprises a first access manner or a second access manner, and the at least one second apparatus comprises the second apparatus;
sending, by the second apparatus, access information of the second apparatus to the network control apparatus based on the access configuration information, wherein the access information requests access, and the access information comprises a first address that belongs to a pre-configured address set; and
in response to the access information, receiving address information from the network control apparatus, wherein the address information indicates to update the first address to a second address that does not belong to the pre-configured address set.

8. The method according to claim 7, wherein the access manner is the first access manner, and the first access manner indicates that access of terminals of a first terminal type and a second terminal type is allowed.

9. The method according to claim 8, wherein the first access manner comprises contention-based access.

10. The method according to claim 8, wherein the second apparatus belongs to the first terminal type or the second terminal type.

11. The method according to claim 8, wherein the sending, by the second apparatus, access information of the second apparatus to the network control apparatus based on the access configuration information comprises:
sending, by the second apparatus, the access information of the second apparatus to the network control apparatus on a pre-configured first time-frequency resource in the first access manner.

12. The method according to claim 8, wherein the address set is predefined in a communications protocol, or the address set is configured by first configuration information from the network control apparatus to the second apparatus, or the address set is agreed between the network control apparatus and the second apparatus before receiving the access configuration information.

13. The method according to claim 8, wherein the method further comprises:
updating, by the second apparatus, the first address to the second address based on the address information.

14. An access apparatus, comprising:
at least one processor; and
one or more memories coupled to the at least one processor and storing programming instructions for execution by the at least one processor to cause the access apparatus to:
send access configuration information, wherein the access configuration information configures an access manner of at least one second apparatus, and the access manner comprises a first access manner or a second access manner;
receive access information from a second apparatus, wherein the access information requests access, and the at least one second apparatus comprises the second apparatus, and wherein the access information comprises a first address that belongs to a pre-configured address set; and
in response to receiving the access information, send address information to the second apparatus, wherein the address information indicates to update the first address to a second address that does not belong to the pre-configured address set.

15. The access apparatus according to claim 14, wherein the access manner is the first access manner, and the first access manner indicates that access of terminals of a first terminal type and a second terminal type is allowed.

16. The access apparatus according to claim 15, wherein the first access manner comprises contention-based access.

17. The access apparatus according to claim 15, wherein the programming instructions, when executed by the at least one processor, cause the access apparatus to:
receive the access information of the second apparatus on a pre-configured first time-frequency resource.

18. The access apparatus according to claim 14, wherein the address set is predefined in a communications protocol, or the address set is configured by first configuration information from the access apparatus to the second apparatus, or the address set is agreed between the access apparatus and the second apparatus before sending the access configuration information.

19. An access apparatus, comprising:
at least one processor; and
one or more memories coupled to the at least one processor and storing programming instructions for execution by the at least one processor to cause the access apparatus to:
receive, access configuration information from a network control apparatus, wherein the access configuration information configures an access manner of at least one second apparatus, the access manner comprises a first access manner or a second access manner, and the at least one second apparatus comprises the access apparatus;
send, access information of the access apparatus to the network control apparatus based on the access configuration information, wherein the access information requests access, and the access information comprises a first address that belongs to a pre-configured address set; and
in response to the access information, receive address information from the network control apparatus, wherein the address information indicates to update the first address to a second address that does not belong to the pre-configured address set.

20. The access apparatus according to claim 19, wherein the access manner is the first access manner, and the first access manner indicates that access of terminals of a first terminal type and a second terminal type is allowed.

21. The access apparatus according to claim 20, wherein the first access manner comprises contention-based access.

22. The access apparatus according to claim 20, wherein the programming instructions, when executed by the at least one processor, cause the access apparatus to:
send the access information of the access apparatus to the network control apparatus on a pre-configured first time-frequency resource in the first access manner.

23. The access apparatus according to claim 19, wherein the address set is predefined in a communications protocol, or the address set is configured by first configuration information from the network control apparatus to the access apparatus, or the address set is agreed between the network control apparatus and the access apparatus before receiving the access configuration information.

24. The access apparatus according to claim 19, wherein the programming instructions, when executed by the at least one processor, cause the access apparatus to:
update, the first address to the second address based on the address information.

25. A communication system, wherein the communication system comprises a first access apparatus and a second access apparatus, wherein:
the second access apparatus is configured to send access configuration information, wherein the access configuration information configures an access manner of at least one access apparatus, and the access manner comprises a first access manner or a second access manner, wherein the at least of one access apparatus comprises the first access apparatus; and
the first access apparatus is configured to receive the access configuration information from the second access apparatus and send access information based on the access configuration information, and wherein the access information comprises a first address that belongs to a pre-configured address set; and
the second access apparatus is configured to receive the access information from the first access apparatus, wherein the access information requests access, and in response to receiving the access information, send address information to the second access apparatus, wherein the address information indicates to update the first address to a second address that does not belong to the pre-configured address set.

26. The method according to claim 1, wherein the second apparatus is a terminal.

27. The method according to claim 1, wherein the second apparatus is another network control apparatus.

28. The communication system according to claim 25, wherein the access manner is the first access manner, and the first access manner indicates that access of terminals of a first terminal type and a second terminal type is allowed.

29. The communication system according to claim 28, wherein the first access manner comprises contention-based access.

30. The communication system according to claim 28, wherein the second access apparatus belongs to the first terminal type or the second terminal type.

31. The communication system according to claim 28, wherein the receiving the access configuration information from the second access apparatus comprises:
receiving the access information of the second access apparatus on a pre-configured first time-frequency resource.

32. The communication system according to claim 28, wherein the address set is predefined in a communications protocol, or the address set is configured by first configuration information from a network control apparatus to the second access apparatus, or the address set is agreed between the network control apparatus and the second access apparatus before sending the access configuration information.

* * * * *